(12) United States Patent
Baker et al.

(10) Patent No.: US 10,099,729 B2
(45) Date of Patent: Oct. 16, 2018

(54) NOSE GAP REDUCERS FOR TRAILERS

(71) Applicant: Wabash National, L.P., Lafayette, IN (US)

(72) Inventors: Leonard W. Baker, Lafayette, IN (US); Brian Haan, Lafayette, IN (US); James A. Sweet, Lafayette, IN (US); Michael J. Courtney, Dayton, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/161,583

(22) Filed: May 23, 2016

(65) Prior Publication Data

US 2016/0339969 A1 Nov. 24, 2016

Related U.S. Application Data

(60) Provisional application No. 62/165,466, filed on May 22, 2015.

(51) Int. Cl.
*B62D 35/00* (2006.01)

(52) U.S. Cl.
CPC .................................. *B62D 35/001* (2013.01)

(58) Field of Classification Search
CPC ..................................................... B62D 35/001
USPC ...................................................... 296/180.4
See application file for complete search history.

(56) References Cited

U.S. PATENT DOCUMENTS

| | | | |
|---|---|---|---|
| 1,837,901 A | 12/1931 | Fottinger et al. | |
| 2,037,942 A | 4/1936 | Stalker | |
| 2,243,906 A | 6/1941 | Huet | |
| 2,863,695 A | 12/1958 | Stamm | |
| 3,425,740 A | 2/1969 | Vaughn | |
| 3,934,922 A | 1/1976 | MacCready, Jr. et al. | |
| 3,999,797 A | 12/1976 | Kirsch et al. | |
| 4,022,508 A | 5/1977 | Kirsch et al. | |
| 4,057,280 A | 11/1977 | MacCready, Jr. et al. | |
| 4,103,957 A | 8/1978 | Landry et al. | |
| 4,113,299 A | 9/1978 | Johnson et al. | |
| 4,142,755 A | 3/1979 | Keedy | |
| 4,311,334 A | 1/1982 | Jenkins | |
| D263,040 S | 2/1982 | Fitzgerald | |
| 4,316,630 A | 2/1982 | Evans | |
| 4,360,232 A | 11/1982 | Elder | |
| 4,401,338 A | 8/1983 | Caldwell | |
| 4,457,550 A | 7/1984 | Gielow et al. | |
| 4,553,782 A * | 11/1985 | Markland | B62D 35/001 296/180.4 |
| 5,280,990 A | 1/1994 | Rinard | |
| 6,257,654 B1 | 7/2001 | Boivin et al. | |
| 6,485,087 B1 | 11/2002 | Roberge et al. | |
| 6,585,312 B2 | 7/2003 | Jain | |

(Continued)

FOREIGN PATENT DOCUMENTS

| | | |
|---|---|---|
| WO | 2014022058 A1 | 2/2014 |
| WO | 2014121937 A1 | 8/2014 |
| WO | 2015191918 A1 | 12/2015 |

*Primary Examiner* — Joseph D. Pape
*Assistant Examiner* — Dana D Ivey
(74) *Attorney, Agent, or Firm* — Quarles & Brady LLP

(57) ABSTRACT

A nose gap reducer for reducing drag on a vehicle is disclosed. The nose gap reducer may be coupled to a vehicle such as a trailer of a semi-trailer truck for example. The trailer may be positioned between a tractor unit or between another trailer.

19 Claims, 17 Drawing Sheets

(56) References Cited

U.S. PATENT DOCUMENTS

| | | |
|---|---|---|
| 6,595,578 B1 | 7/2003 | Calsoyds et al. |
| 6,799,791 B2 | 10/2004 | Reiman et al. |
| 6,886,882 B2 | 5/2005 | Farlow et al. |
| 6,932,419 B1 | 8/2005 | McCullough |
| 6,986,544 B2 | 1/2006 | Wood |
| 7,000,978 B1 | 2/2006 | Messano |
| 7,008,004 B2 | 3/2006 | Ortega et al. |
| 7,008,005 B1 | 3/2006 | Graham |
| 7,090,287 B1 | 8/2006 | Eberst |
| 7,118,164 B2 | 10/2006 | Frank et al. |
| 7,240,958 B2 | 7/2007 | Skopic |
| 7,318,620 B2 | 1/2008 | Wood |
| 7,404,592 B2 | 7/2008 | Reiman et al. |
| 7,537,270 B2 | 5/2009 | O'Grady |
| D595,195 S | 6/2009 | Fitzgerald |
| 7,585,015 B2 | 9/2009 | Wood |
| 7,604,284 B2 | 10/2009 | Reiman et al. |
| 7,748,771 B2 | 7/2010 | Distel et al. |
| 7,748,772 B2 | 7/2010 | Boivin et al. |
| 7,798,412 B2 | 9/2010 | Dewan |
| 7,837,254 B2 | 11/2010 | Reiman et al. |
| 7,854,468 B2 | 12/2010 | Vogel et al. |
| 7,942,466 B2 | 5/2011 | Reiman et al. |
| 7,976,096 B2 | 7/2011 | Holubar |
| 8,025,330 B2 | 9/2011 | Reiman et al. |
| 8,075,046 B2 | 12/2011 | Pursley |
| 8,083,284 B1 | 12/2011 | Logounov |
| 8,100,461 B2 | 1/2012 | Smith et al. |
| 8,113,570 B1 | 2/2012 | Smith |
| 8,123,281 B2 | 2/2012 | Perkins et al. |
| 8,167,358 B2 | 5/2012 | Burrows |
| 8,177,287 B2 | 5/2012 | Vogel et al. |
| 8,196,993 B2 | 6/2012 | Smith |
| 8,251,436 B2 | 8/2012 | Henderson et al. |
| 8,272,680 B2 | 9/2012 | Breidenbach |
| 8,360,509 B2 | 1/2013 | Smith et al. |
| 8,383,194 B2 | 2/2013 | Ohmi et al. |
| 8,408,570 B2 | 4/2013 | Heppel et al. |
| 8,419,109 B2 | 4/2013 | Pickering |
| 8,506,004 B1 | 8/2013 | Vogel et al. |
| 8,515,452 B2 | 8/2013 | Craine et al. |
| 8,517,452 B2 | 8/2013 | Kenevan |
| 8,534,746 B1 | 9/2013 | Smith |
| 8,550,540 B1 | 10/2013 | Pacholyk et al. |
| 8,550,546 B2 | 10/2013 | Breit |
| 8,562,011 B1 | 10/2013 | Smith |
| 8,590,961 B2 | 11/2013 | Breidenbach |
| 8,648,448 B2 | 2/2014 | Pagaila et al. |
| 8,801,077 B2 | 8/2014 | Vogel et al. |
| 8,807,628 B1 | 8/2014 | Pfaff |
| 8,827,351 B1 | 9/2014 | Kenevan |
| 8,925,997 B2 | 1/2015 | Hjelm |
| 9,079,622 B2 | 7/2015 | Gan et al. |
| 9,616,945 B1 | 4/2017 | Henderson et al. |
| 2011/0068603 A1 | 3/2011 | Domo et al. |
| 2011/0148142 A1 | 6/2011 | Kint |
| 2012/0126572 A1 | 5/2012 | Hjelm et al. |
| 2012/0261946 A1 | 10/2012 | Steel |
| 2012/0261947 A1 | 10/2012 | Nauert |
| 2013/0007606 A1 | 1/2013 | Dolenc |
| 2013/0062908 A1 | 3/2013 | Henderson et al. |
| 2014/0062125 A1 | 3/2014 | Elias |
| 2014/0319871 A1* | 10/2014 | Gan ............ B62D 35/001 296/180.2 |
| 2015/0253058 A1 | 9/2015 | Casasanta |
| 2015/0367900 A1 | 12/2015 | Buffo et al. |
| 2016/0096556 A1 | 4/2016 | Kantharaju et al. |
| 2016/0194037 A1 | 7/2016 | Logounov |
| 2016/0214660 A1 | 7/2016 | Conny |

* cited by examiner

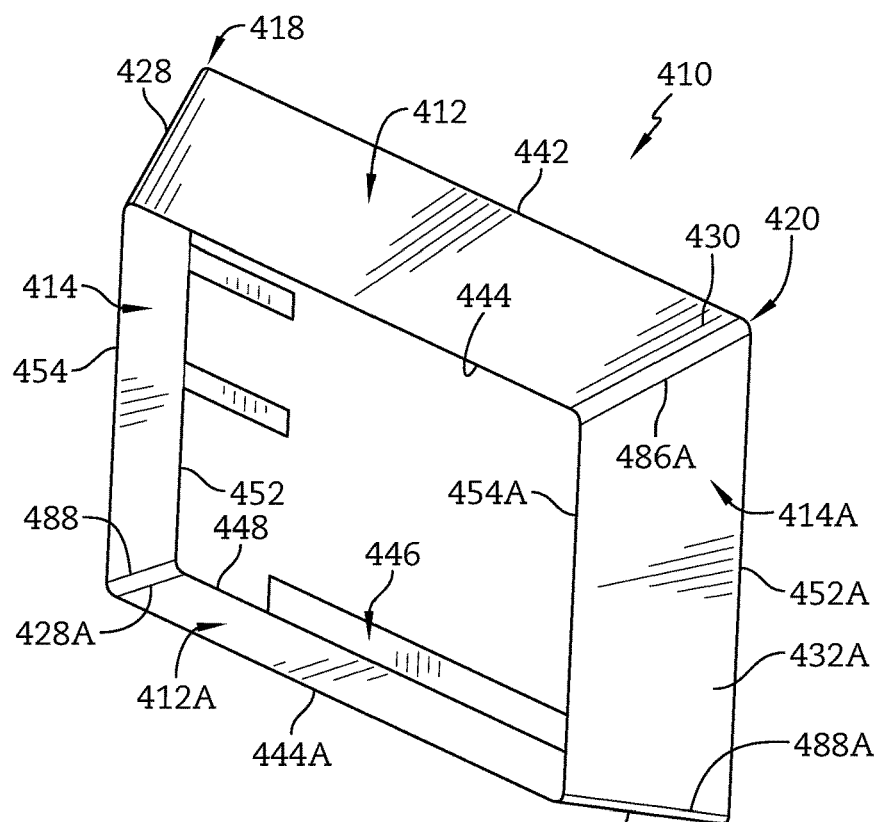
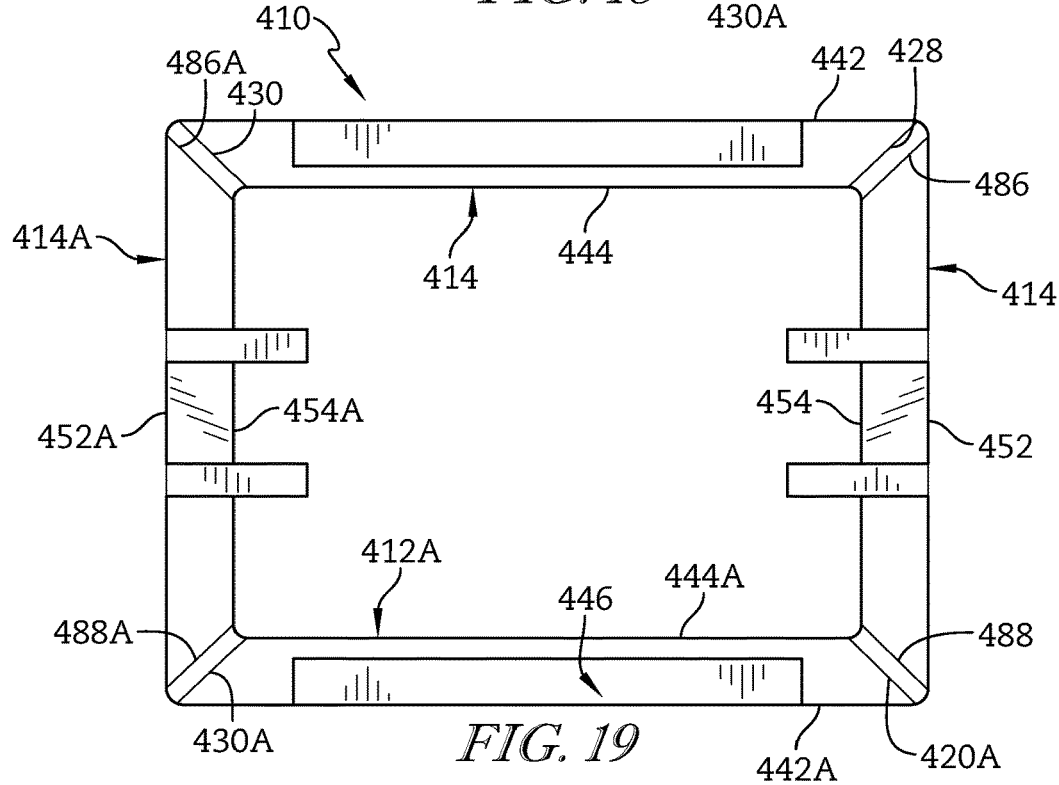

NOSE GAP REDUCERS FOR TRAILERS

CROSS REFERENCE TO RELATED APPLICATIONS

This application claims priority to and the benefit of U.S. Provisional Patent Application No. 62/165,466, filed 22 May 2015, the disclosure of which is now expressly incorporated herein by reference.

FIELD OF THE DISCLOSURE

The present disclosure relates generally to vehicles and trailers for vehicles. In particular, the present disclosure relates to nose gap reducers for reducing drag on a trailer, for example.

BACKGROUND

To reduce wind flow resistance and drag on a semi-trailer truck, trailer, truck, semitrailer, or other vehicle, aerodynamic devices may be used to redirect and control the flow of air passing around the vehicle. During operation of a semi-trailer truck, air around the semi-trailer truck may flow between the tractor unit and the trailer and impart a drag force to the trailer. Aerodynamic devices are designed to control the air flowing into the gap formed between the tractor unit and the trailer. Such reduction on the drag of the vehicle may operate to conserve fossil fuels as well as other sources of vehicle drive power for hybrid vehicles, battery-operated vehicles, and alternative fuel-based vehicles, for example.

SUMMARY

The present disclosure may comprise one or more of the features recited in the attached claims and/or one or more of the following features and combinations thereof.

According to one aspect of the present disclosure, a trailer assembly may include a trailer and an aerodynamic nose gap reducer. The trailer may be formed to include a front end wall having a height, a rear end opposite the front end wall, a first side wall, a second side wall, and a roof. The first side wall may extend along a length of the trailer between the front end wall and the rear end. The second side wall may extend between the front end wall and the rear end. The second side wall may be spaced apart from the first side wall to define a width of the trailer. The roof may be coupled to the first and second side walls.

The aerodynamic nose gap reducer may be coupled to the front end wall of the trailer. The nose gap reducer may have an upper fin assembly, a first side fin assembly, and a second side fin assembly. The upper fin assembly may extend across the width of the trailer. The first side fin assembly may extend downwardly away from the upper fin assembly. The second side fin assembly may be coupled to the upper fin assembly and may be spaced apart from the first side fin assembly. At least one of the upper, first side, and second side fin assemblies may be spaced apart from the front end wall of the trailer to form a vent gap between the nose gap reducer and the trailer to allow air to flow between the nose gap reducer and the trailer.

Illustratively, the roof defines a roof plane. The upper fin assembly includes an upper edge that lies in the roof plane, a lower edge, and an upper surface that extends downwardly from the upper edge to the lower edge at an angle alpha relative to the roof plane and the angle alpha is between about 15 degrees and about 40 degrees.

Illustratively, the first side wall of the trailer defines a side plane. The first side fin assembly includes an outer edge, an inner edge, and an outer surface. The outer edge lies in the side plane. The inner edge is spaced apart from the outer edge. The outer surface extends inwardly toward the second side fin assembly from the outer edge to the inner edge at an angle theta relative to the side plane, and the angle theta is between about 15 degrees and about 40 degrees.

Illustratively, the trailer further includes a curved corner joint that extends generally vertically and couples the first side wall of the trailer with the front end wall of the trailer to form a rounded corner of the trailer. The rounded corner and the outer edge of the first side fin assembly define the vent gap.

Illustratively, the side fin assembly further includes a side extender coupled to the outer edge of the first side fin assembly, the side extender extends rearwardly away from the outer edge of the first side fin assembly toward the rear end of the trailer, and the side extender is spaced apart from and overlaps the curved corner joint.

Illustratively, the nose gap reducer is configured to compress to reduce a length of the nose gap reducer in response to a compression force being applied to the nose gap reducer. The nose gap reducer is configured to return to a pre-compressed length in response to the compression force being removed from the nose gap reducer.

According to another aspect of the present disclosure, an aerodynamic nose gap reducer for reducing drag on a trailer may include a rigid support backer, a compressible fin insert, and a deformable housing. The rigid support backer may extend along a width of the nose gap reducer. The compressible fin insert may extend outwardly away from the rigid support backer. The compressible fin insert may be configured to compress to reduce a length of the nose gap reducer in response to a compression force being applied to the compressible fin insert and to return to a pre-compressed shape in response to the compression force being removed from the compressible fin insert. The deformable housing may be arranged around the compressible fin insert and the rigid support backer. The deformable housing may be configured to change shape with the compressible fin insert.

Illustratively, the nose gap reducer further includes a first surface and a second surface connected to the first surface. The first surface is angled relative to the second surface by an angle alpha and the angle alpha is between about 15 degrees and about 40 degrees. Illustratively, the angle alpha is about 33 degrees.

Illustratively, the nose gap reducer further includes a third surface that extends between the first and second surfaces along the width of the nose gap reducer and a fourth surface that interconnects the first, second, and third surfaces. The fourth surface is angled relative to the third surface by an angle beta and the angle beta is between about 15 degrees and about 40 degrees. In some embodiments, the angle beta is between about 30 degrees and about 35 degrees.

Illustratively, the compressible fin insert includes a compressible body comprising foam material and an inner layer arranged around the compressible body. The compressible body has a triangular cross-section when viewed along the width of the nose gap reducer. The compressible fin insert is configured to be compressed to between about 80 percent and about 30 percent of a pre-compressed length of the compressible fin insert and to return to about 100 percent of the pre-compressed length in response to the compression force being removed.

Illustratively, the inner layer is formed to define a plurality of evacuation apertures that extend through the inner layer. The evacuation apertures are located at an upper end of the compressible fin insert relative to ground.

Illustratively, the deformable housing is formed to include a plurality of purge holes extending through the deformable housing. The purge holes are located at a lower end of the nose gap reducer relative to ground.

Illustratively, the rigid support backer includes an outer wall and a plurality of ribs coupled to the outer wall. The housing includes a plurality of brackets coupled to the outer wall of the rigid support backer.

According to yet another aspect of the present disclosure, a method of making and using a compressible nose gap reducer for a trailer may include a number of steps. The method may include providing a compressible upper fin assembly, a compressible first side fin assembly, and a compressible second side fin assembly, each of the compressible fin assemblies being configured to compress and reduce in length in response to a compression force being applied to the corresponding upper fin assembly, first side fin assembly, and second side fin assembly and to return to a pre-compressed shape in response to the compression force being removed from the corresponding upper fin assembly, first side fin assembly, and second side fin assembly, and coupling together the upper fin assembly, the first side fin assembly, and the second side fin assembly to form the nose gap reducer.

In some embodiments, the method further includes applying the compression force to the nose gap reducer to compress at least one of the upper fin assembly, the first side fin assembly, and the second side fin assembly to reduce a length of the nose gap reducer by between about 30 percent and about 80 percent of a pre-compressed length of the corresponding upper fin assembly, first side fin assembly, and second side fin assembly. In some embodiments, the method further includes removing the compression force to cause the corresponding upper fin assembly, first side fin assembly, and second side fin assembly to return to the pre-compressed length when the compression force is removed.

In some embodiments, the method further includes coupling the nose gap reducer to a first trailer to form a vent gap between the first trailer and the nose gap reducer. In some embodiments, the method further includes moving a second trailer into engagement with the nose gap reducer to compress the nose gap reducer and reduce a length of the nose gap reducer by between about 30 percent and about 80 percent of a pre-compressed length of the nose gap reducer and moving the second trailer out of engagement with the nose gap reducer to allow the nose gap reducer to return to about the pre-compressed length of the nose gap reducer.

According to another aspect of the present disclosure, a nose gap reducer for reducing drag on a trailer includes an upper fin assembly arranged to extend along a width of a trailer, a first side fin assembly extending downwardly away from the upper fin assembly, and a second side fin assembly spaced apart from the first side fin assembly and extending downwardly away from the upper fin assembly. The fin assemblies are configured to be compressed to reduce a size of the nose gap reducer when a compression force is applied to the nose gap reducer and to return to their pre-compressed shape when the compression force is removed.

Illustratively, the upper fin assembly includes an upper surface, a lower surface connected to the upper surface along a lower edge of the upper surface, and a rear surface interconnecting the upper and lower surfaces. Illustratively, an upper fin length is defined between the lower edge and the rear surface, and the upper fin length is reduced when a compression force normal to the rear surface is applied to the upper fin assembly.

In some embodiments, the upper surface is angled relative to the lower surface by an angle alpha and the angle alpha is between about 15 and about 40 degrees. In some embodiments, the angle alpha is between about 30 and about 35 degrees. Illustratively, the angle alpha is about 33 degrees. In some embodiments, the angle alpha is about 19 degrees.

Illustratively, the upper fin assembly further includes a first side surface interconnecting the upper and lower surfaces and a second side surface spaced apart from the first side surface and interconnecting the upper and lower surfaces. In some embodiments, the first side surface is angled relative to the rear surface by an angle beta and the angle beta is between about 15 and about 40 degrees. In some embodiments, the angle beta is between about 30 and about 35 degrees. Illustratively, the angle beta is about 33 degrees. In some embodiments, the angle beta is about 35 degrees. In some embodiments, the angle beta is about 20 degrees.

Illustratively, the first side fin assembly includes an outer surface, an inner surface connected to the outer surface along an inner edge of the outer surface, and a rear surface interconnecting the outer and inner surfaces. Illustratively, a first side fin length is defined between the inner edge and the rear surface, and the first side fin length is reduced when a compression force normal to the rear surface is applied to the first side fin assembly.

In some embodiments, the outer surface is angled relative to the inner surface by an angle theta and the angle theta is between about 15 and about 40 degrees. In some embodiments, the angle theta is between about 30 and about 35 degrees. Illustratively, the angle theta is about 33 degrees. Illustratively, the nose gap reducer is arranged to be spaced apart from a front end wall of a trailer to form a vent gap therebetween.

Illustratively, each fin assembly comprises a compressible fin insert, a rigid support backer, and a housing arranged around the fin insert and the support backer. Illustratively, the fin insert includes a compressible body formed to provide the fin assembly with the desired shape and configured to be compressed by the compression force to reduce the length of the fin assembly and to return to its pre-compressed shape when the compression force is removed. Illustratively, the compressible body comprises a lightweight foam material.

In some embodiments, the compressible body is configured to be compressed to between about 80 percent and about 30 percent of its pre-compressed length. Illustratively, the compressible body is configured to be compressed to about 75 percent of its pre-compressed length. In some embodiments, the compressible body is configured to be compressed to about 40 percent of its pre-compressed length.

Illustratively, the fin insert further includes an inner layer arranged around the compressible body. Illustratively, the inner layer comprises a plastic material. Illustratively, the inner layer comprises a plurality of evacuation apertures extending through the inner layer. Illustratively, the plurality of evacuation apertures are located near a top end of the fin insert.

Illustratively, the housing includes an outer layer arranged around the fin insert and the support backer. Illustratively, the outer layer comprises a vinyl material. Illustratively, the outer layer is formed to include a plurality of purge holes extending through the outer layer. Illustratively, the purge holes are located near a bottom end of the fin assembly.

Illustratively, the housing further includes mounting brackets coupled to the support backer. Illustratively, the nose gap reducer further includes a lower fin assembly spaced apart from the upper fin assembly and extends between the first and second side fin assemblies. Illustratively, the nose gap reducer further includes side extenders extending rearwardly from the side assemblies.

In some embodiments, the first and second side fin assemblies have a height of about 76 inches. Illustratively, the nose gap reducer is coupled to a first trailer in a tractor-trailer gap formed between a tractor unit and a first trailer. Illustratively, the nose gap reducer is coupled to a second trailer in a trailer-trailer gap formed between the first trailer and a second trailer.

According to another aspect of the present disclosure a semi-trailer truck includes a tractor unit, a trailer coupled to the tractor unit to form a tractor-trailer gap therebetween, and an aerodynamic nose gap reducer located in the tractor-trailer gap and coupled to the first trailer, the nose gap reducer is arranged around a perimeter of a front end wall of the trailer, and portions of the nose gap reducer are spaced apart from the first trailer to form vent gaps therebetween to allow air to flow between the nose gap reducer and the trailer out of the tractor-trailer gap.

Illustratively, the nose gap reducer includes an upper fin assembly arranged to extend along a width of the front end wall of the trailer, a first side fin assembly extending downwardly away from the upper fin assembly along a first side of the front end wall, and a second side fin assembly spaced apart from the first side fin assembly and extending downwardly away from the upper fin assembly along a second side of the front end wall. Illustratively, the vent gaps are formed between the first side fin assembly and the front end wall. Illustratively, the nose gap reducer is configured to be compressed to reduce a size of the nose gap reducer when a compression force is applied to the nose gap reducer and to return to its pre-compressed shape when the compression force is removed.

According to another aspect of the present disclosure, a method of assembling a nose gap reducer for a trailer is provided. The method includes providing an upper fin assembly, a first side fin assembly, and a second side fin assembly, and coupling together the upper fin assembly, the first side fin assembly, and the second side fin assembly.

In some embodiments, the upper fin assembly, the first side fin assembly, and the second side fin assembly are configured to be compressed to reduce a size of the nose gap reducer when a compression force is applied to the nose gap reducer and to return to their pre-compressed shape when the compression force is removed. In some embodiments, the method further includes coupling the nose gap reducer to a trailer to form a vent gap between the trailer and the nose gap reducer.

According to another aspect of the present disclosure, a method of reducing air resistance on a trailer is provided. The method includes providing a compressible nose gap reducer having an upper fin assembly, a first side fin assembly, and a second side fin assembly.

In some embodiments, the method further includes coupling the nose gap reducer to a trailer. In some embodiments, the method further includes coupling together the upper fin assembly, the first side fin assembly, and the second side fin assembly. In some embodiments, the method further includes coupling the nose gap reducer to a trailer to form a vent gap between the trailer and the nose gap reducer.

These and other features of the present disclosure will become more apparent from the following description of the illustrative embodiments.

BRIEF DESCRIPTION OF THE DRAWINGS

FIG. 18 is a perspective view of the fourth embodiment of the nose gap reducer;

FIG. 19 is a back elevation view of the nose gap reducer of FIG. 18;

DETAILED DESCRIPTION OF THE DRAWINGS

For the purposes of promoting an understanding of the principles of the disclosure, reference will now be made to a number of illustrative embodiments shown in the attached drawings and specific language will be used to describe the same. While the concepts of this disclosure are described in relation to a semi-trailer truck, it will be understood that they are equally applicable to other trailers generally, and more specifically to conventional flat-bed and/or box or van type trailers, examples of which include, but should not be limited to, straight truck bodies, small personal and/or commercial trailers and the like.

An aerodynamic nose gap reducer 110 is coupled to a semi-trailer truck 10 as shown in FIGS. 1-6. The illustrative nose gap reducer 110 is configured to be compressed by a compression force to reduce a length of the nose gap reducer 110 and to return to its pre-compressed shape when the compression force is removed.

Figure 1:
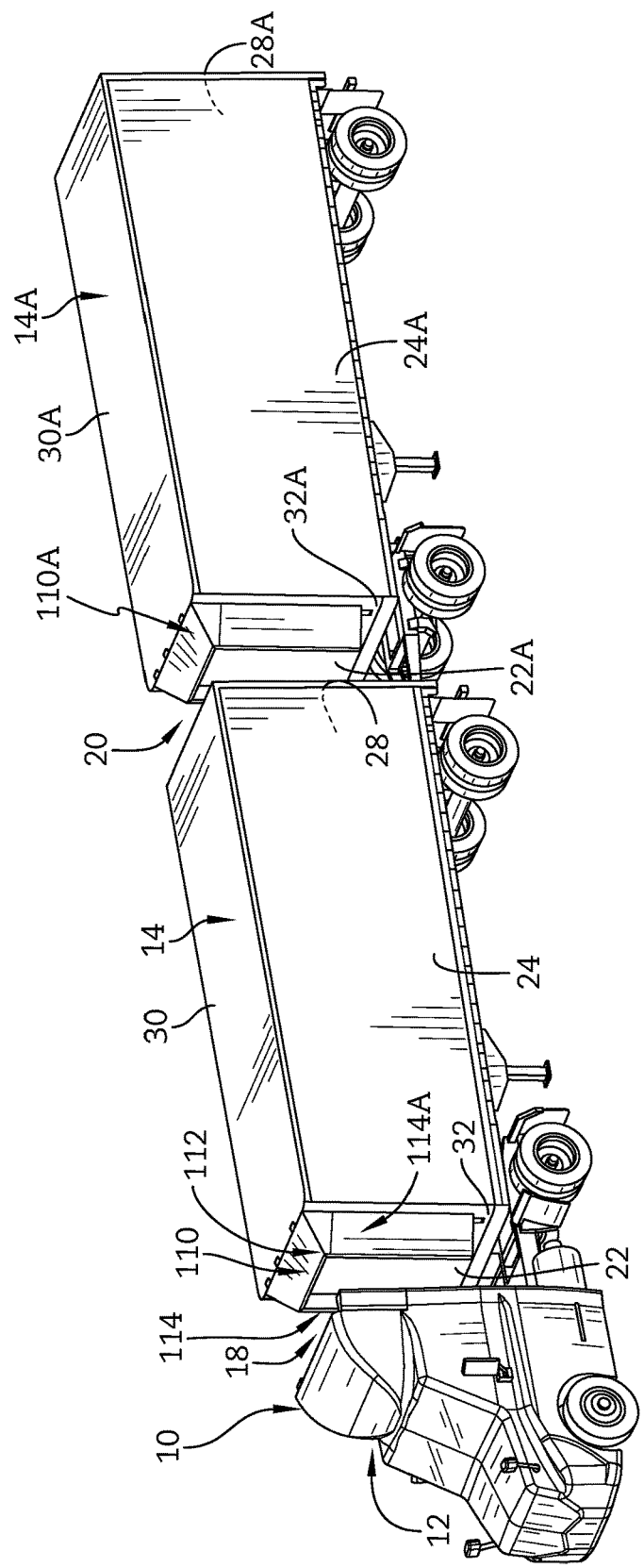
FIG. 1 is a perspective view of a semi-trailer truck having, from left to right, a tractor unit, a first trailer, and a second trailer and showing a first compressible aerodynamic nose gap reducer coupled to a front of the first trailer and located in a gap formed between the tractor unit and the first trailer and a second compressible aerodynamic nose gap reducer coupled to a front of the second trailer and located in a gap formed between the first trailer and the second trailer.

The semi-trailer truck 10 illustratively includes a tractor unit 12, a first trailer 14, and a second trailer 14A as shown in FIG. 1. A first nose gap reducer 110 is coupled to the first trailer 14 and positioned in a tractor-trailer gap 18 formed between the tractor unit 12 and the first trailer 14. A second nose gap reducer 110A is coupled to the second trailer 14A and positioned in a trailer-trailer gap 20 formed between the first trailer 14 and the second trailer 14A.

Illustratively, the nose gap reducers 110, 110A operate to improve the aerodynamic efficiency of the semi-trailer truck 10 by reducing drag and wind flow in the tractor-trailer gap 18 and the trailer-trailer gap 20. In particular, the nose gap reducers 110, 110A operate to reduce airflow into the gaps 18, 20 while the semi-trailer truck 10 is traveling down the road. This reduction of airflow into the gaps 18, 20 may increase the fuel efficiency or the efficiency of any other source of vehicle drive power of the tractor/trailer combination.

As shown in FIG. 1, the first trailer 14 includes a front end wall 22, side walls 24, a rear end wall 28, and a roof 30 defining an inside storage portion (not shown) able to store various articles and/or goods therein. The illustrative first trailer 14 further includes corner joints 32 that interconnect the front end wall 22 and the side walls 24. The rear end wall 28 may be closable, for example, with a door. The door could be hinged or slidable relative to the rear end wall 28.

Figure 4:
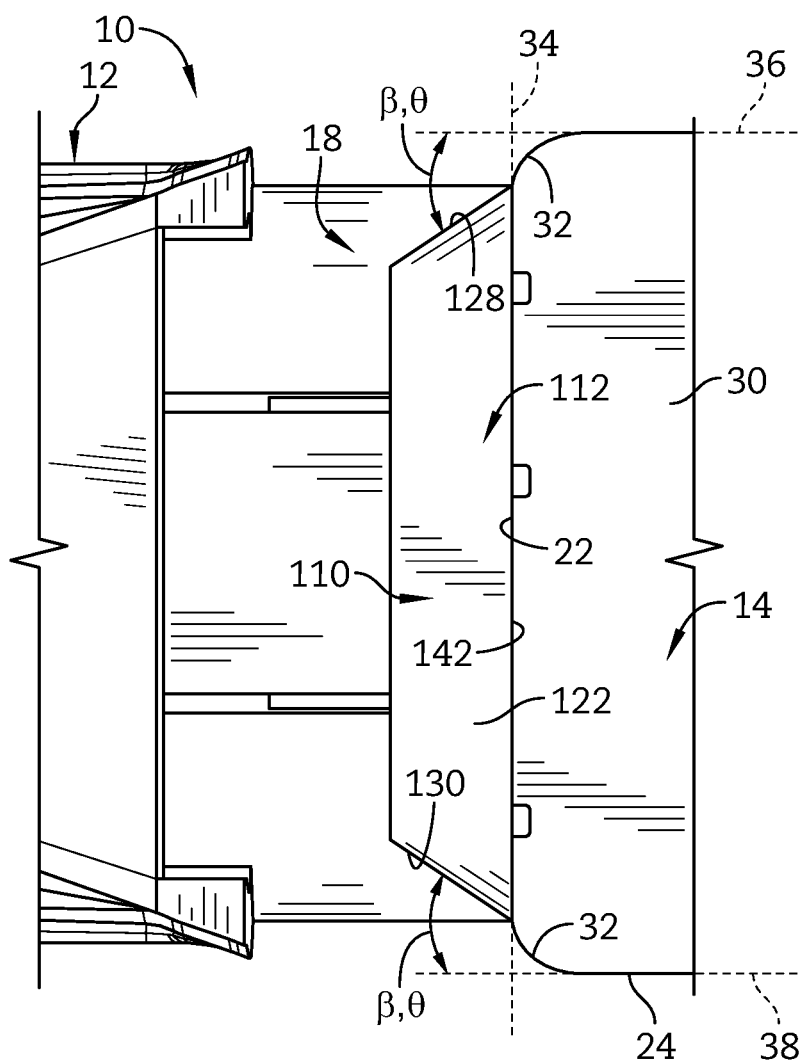
FIG. 4 is a top plan view of the semi-trailer truck of FIG. 1 showing the compressible nose gap reducer coupled to the first trailer and extending into the gap formed between tractor unit and the first trailer to control a flow of air passing around the semi-trailer truck.
Figure 6:
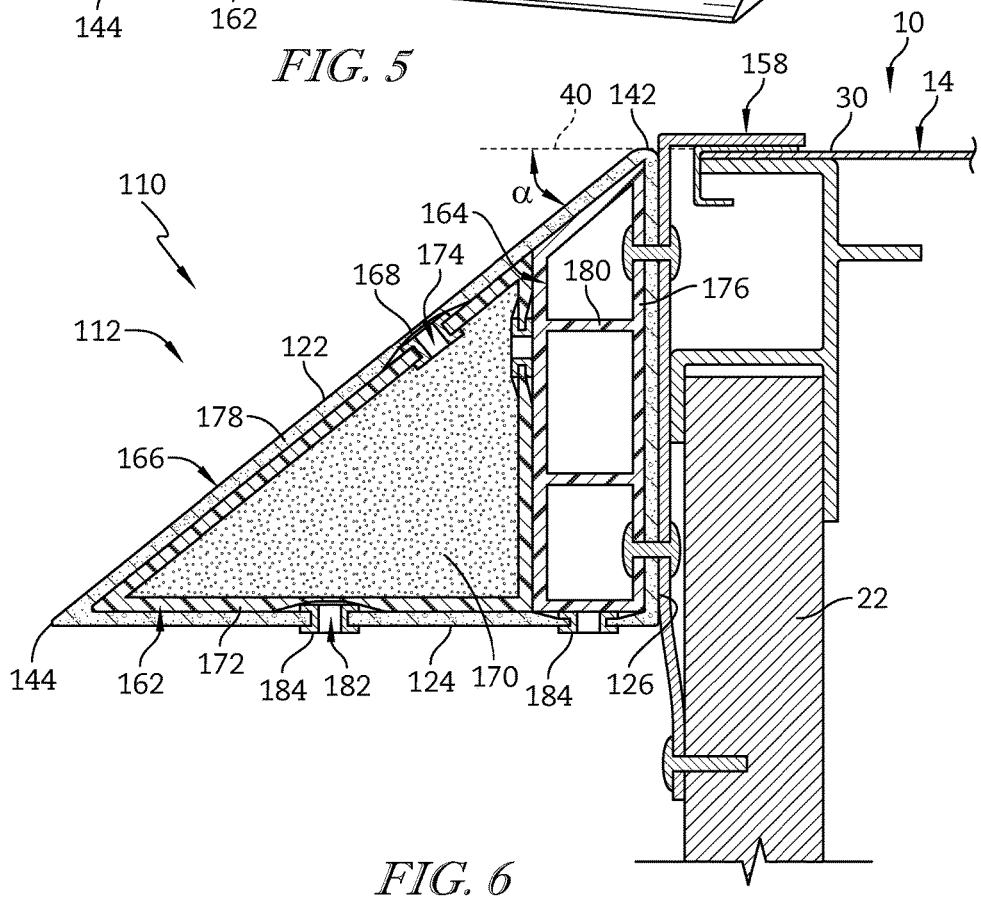
FIG. 6 is a diagrammatic view of a cross-section of the upper fin assembly included in the compressible nose gap reducer of FIG. 2 showing the fin insert, the support backer, and the housing included in the compressible nose gap reducer.

The front end wall 22 is spaced apart from a back end of the tractor unit 12 as shown in FIGS. 1 and 4. Illustratively, the front end wall 22 is generally flat and lies in a front plane 34 as shown in FIG. 4. The side walls 24 extend along a length of the first trailer 14 as shown in FIG. 1. Illustratively, the side walls 24 are generally flat and lie in spaced apart side planes 36, 38 as shown in FIG. 4. The side planes 36, 38 are generally orthogonal to the front plane 34 and, thus, the side walls 24 are generally orthogonal to the front end wall 22. Illustratively, the roof 30 is generally flat and lies in a roof plane 40 as shown in FIG. 6. The roof plane 40 is generally orthogonal to the side planes 36, 38 and the front plane 34 and, thus, the roof 30 is generally orthogonal to the front end wall 22 and the side walls 24. Illustratively, the corner joints 32 extend generally vertically and are curved to round the front end of the first trailer 14 as shown in FIGS. 1 and 4.

The illustrative nose gap reducer 110 is compressible to reduce a length of the nose gap reducer 110. As one example, when the first and the second trailers 14, 14A are not being used and, instead, are being stored in a lot, the rear end of the first trailer 14 may be backed into the front end of the second trailer 14A to cause the rear end of the first trailer 14 to compress the nose gap reducer 110A coupled to the second trailer 14A and reduce a length of the nose gap reducer 110A. As a result, the lot space used to store the first and second trailers 14, 14A with nose gap reducers 110 is reduced. When the first trailer 14 is moved away from the second trailer 14A, the nose gap reducer 110A coupled to the second trailer 14A expands to its pre-compressed shape.

The second trailer 14A includes a front end wall 22A, side walls 24A, a rear end wall 28A, and a roof 30A defining an inside storage portion, and corner joints 32A as shown in FIG. 1. The second trailer 14A is substantially similar to the first trailer 14. As such, the second trailer 14A is not discussed in detail. The nose gap reducer 110A coupled to the second trailer 14A is substantially similar to the nose gap reducer 110 and is not discussed in detail.

Figure 2:
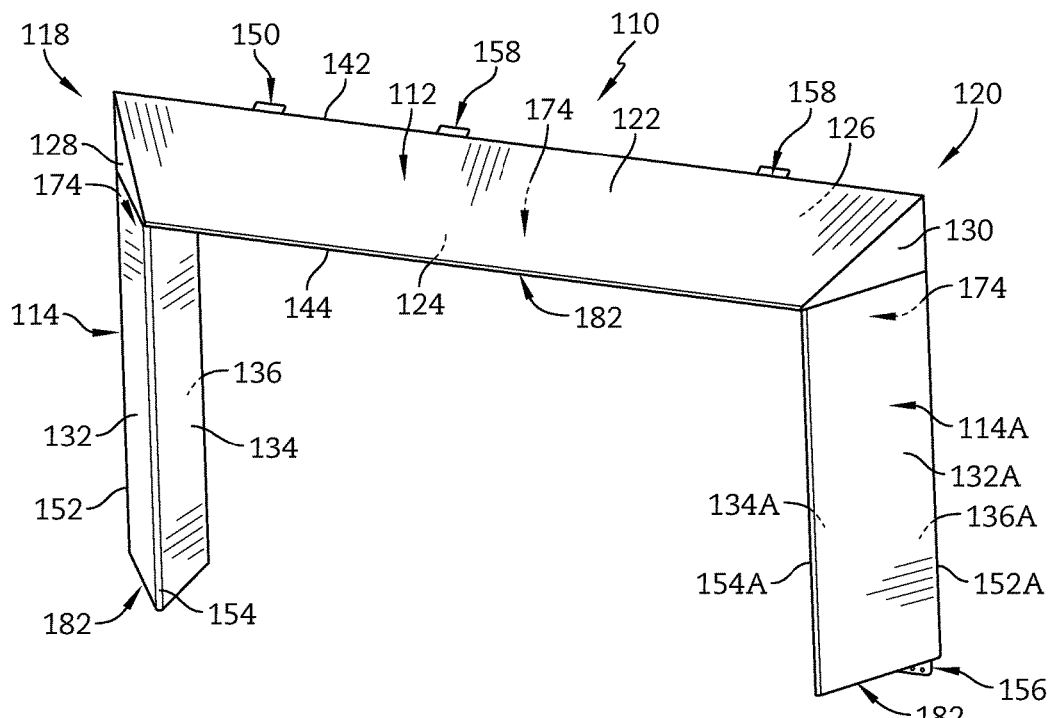
FIG. 2 is a perspective view of the compressible nose gap reducer coupled to the semi-trailer truck of FIG. 1 showing that the compressible nose gap reducer includes an upper fin assembly, a first side fin assembly extending downwardly away from the upper fin assembly, and a second side fin assembly extending downwardly away from the upper fin assembly.
Figure 3:
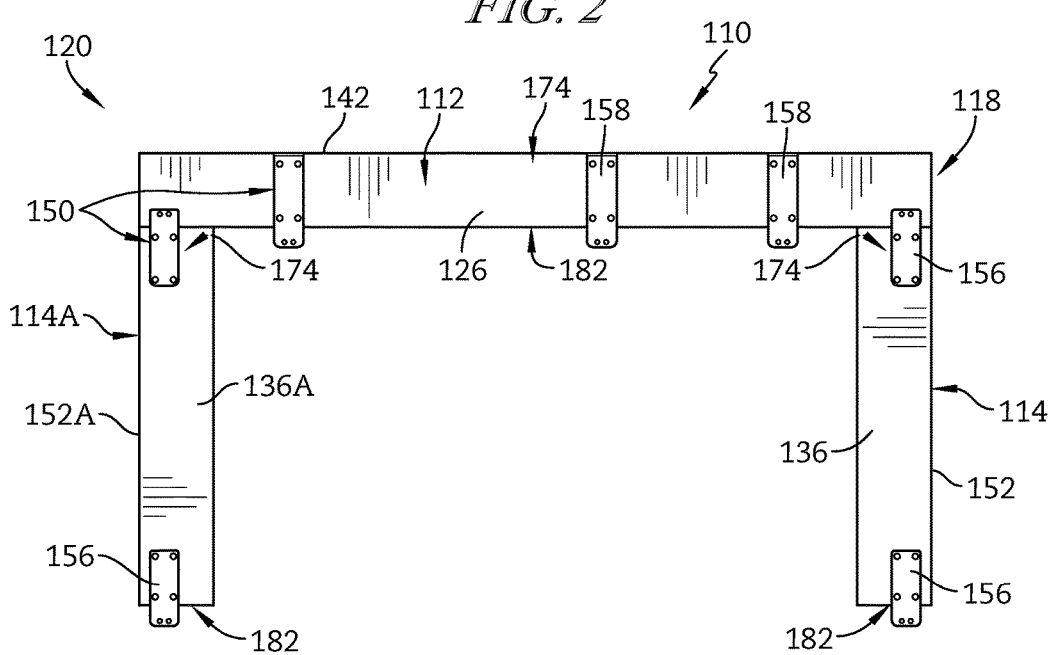
FIG. 3 is a rear elevation view of the nose gap reducer of FIG. 2 showing a plurality of mounting brackets coupled to the upper, first side, and second side fin assemblies and adapted to couple the compressible nose gap reducer to a trailer included in the semi-trailer truck of FIG. 1.

The nose gap reducer 110 includes an upper fin assembly 112, a first side fin assembly 114, and a second side fin assembly 114A as shown in FIGS. 2 and 3. The upper fin assembly 112 has a first end 118 and a second end 120 spaced apart from the first end 118. The upper fin assembly 112 extends generally horizontally relative to ground supporting the semi-trailer truck 10 between the first and second ends 118, 120. The first side fin assembly 114 is coupled to the upper fin assembly 112 at the first end 118 and extends generally vertically relative to ground. The second side fin assembly 114A is coupled to the upper fin assembly 112 at the second end 120 and extends generally vertically relative to ground. A plurality of mounting brackets 150 couple together the fin assemblies 112, 114, 114A to form the nose gap reducer 110 and couple the nose gap reducer 110 with the first trailer 14.

In the illustrative embodiment, the upper fin assembly 112, the first side fin assembly 114, and the second side fin assembly 114A are generally triangle shaped as shown in FIGS. 2 and 6. In other embodiments, the upper fin assembly 112, the first side fin assembly 114, and the second side fin assembly 114A may be curved. In the illustrative embodiment, the nose gap reducer 110 is coupled to the first trailer 14 by the mounting brackets 150. In other embodiments, the nose gap reducer 110 may be coupled to the first trailer 14 by fasteners, adhesive, or any other suitable alternative.

The upper fin assembly 112 includes an upper surface 122, a lower surface 124 spaced apart from the upper surface 122, a rear surface 126, a left side surface 128, and a right side surface 130 as shown in FIG. 2. The upper surface 122 is generally flat and extends at an angle α relative to the roof plane 40 toward ground as shown in FIG. 6. In other embodiments, the upper surface 122 is curved. The lower surface 124 is generally flat and extends about horizontally relative to ground. The side surfaces 128, 130 interconnect upper surface 122 and lower surface 124. Each side surface 128, 130 extends inwardly at an angle beta toward the other side surface 128, 130 relative to the side planes 36, 38 as shown in FIG. 4. The rear surface 126 is generally flat and interconnects the upper surface 122 and the lower surface 124.

The upper surface 122 is angled relative to the roof plane 40 to direct airflow over the first trailer 14. In some embodiments, the angle alpha is between about 15 and about 40 degrees. In some embodiments, the angle alpha is between about 30 and about 35 degrees. In the illustrative embodiment, the angle alpha is about 33 degrees. In some embodiments, the angle alpha is about 19 degrees. In some embodiments, the angle beta is between about 15 and about 40 degrees. In some embodiments, the angle beta is between about 30 and about 35 degrees. In the illustrative embodiment, the angle beta is about 33 degrees. In some embodiments, the angle beta is about 35 degrees. In some embodiments, the angle alpha and the angle beta are different.

The upper surface 122 includes an upper edge 142 and a lower edge 144 as shown in FIG. 2. The upper edge 142 lies about flush with the roof 30 as shown in FIG. 6. In some embodiments, the upper edge 142 lies in the roof plane 40. The upper surface 122 extends from the upper edge 142 downwardly relative to the roof plane 40 and outwardly away from the rear surface 126 to the lower edge 144. Illustratively, the upper edge 142 extends between the side walls 24 of the first trailer 14. In some embodiments, the first and second ends 118, 120 of the upper fin assembly 112 lie in the side planes 36, 38. In the illustratively embodiment, the upper edge 142 has a width of about 83 inches.

The lower surface 124 defines an upper fin length measured between the lower edge 144 and the rear surface 126. In some embodiments, the upper fin length is between about 30 and about 5 inches. In some embodiments, the upper fin length is between about 13.5 and about 11.5 inches. In the illustrative embodiment, the upper fin length is about 12 inches. In other embodiments, the upper fin length is about 25 inches. In some embodiments, the upper fin length is about 20 inches.

The first side fin assembly 114 includes an outer surface 132, an inner surface 134 spaced apart from the outer surface 132, and a rear surface 136 as shown in FIG. 2. The outer surface 132 is generally flat and extends at an angle theta relative to the side plane 36 as shown in FIG. 4. In other embodiments, the outer surface 132 is curved. The inner surface 134 is generally flat and extends about perpendicular to the rear surface 136. The rear surface 136 is generally flat and interconnects the outer surface 132 and the inner surface 134.

The outer surface 132 is angled relative to the side plane 36 to direct airflow around the first trailer 14. In some embodiments, the angle theta is between about 30 and about 35 degrees. In some embodiments, the angle theta is between about 32 and about 35 degrees. In the illustrative embodiment, the angle theta is about 33 degrees. In other embodiments, the angel theta is about 35 degrees. In the illustrative embodiment, the angle theta and the angle beta are equal. In other embodiments, the angle theta, the angle beta, and the angle alpha are different.

The outer surface 132 includes an outer edge 152 and an inner edge 154 as shown in FIG. 2. The outer edge 152 is generally linear and extends about vertically relative to ground. The inner edge 154 is generally linear and extends about vertically relative to ground. The outer surface 132 extends from the outer edge 152 inwardly toward the inner edge 154.

In some embodiments, the outer edge 152 has a height of about 80 inches to about 10 inches. In some embodiments, the outer edge 152 has a height of about 50 to about 30 inches. In the illustrative embodiment, the outer edge 152 has a height of about 40 inches. In some embodiments, the nose gap reducer 110 has a height of about 160 inches to about 10 inches. In some embodiments, the nose gap reducer 110 has a height of about 140 inches to about 45 inches. In some embodiments, the nose gap reducer 110 has a height of about 80 inches to about 30 inches. In some embodiments, the nose gap reducer 110 has a height of about 60 inches to about 40 inches. In the illustrative embodiment, the nose gap reducer 110 has a height of about 50 inches. In some embodiments, the nose gap reducer has a height of about 45 inches. In other embodiments, the nose gap reducer has a height of about 78 inches. In other embodiments, the nose gap reducer has a height of about 135 inches.

The inner surface 134 defines a first side fin length measured between the inner edge 154 and the rear surface 136. In some embodiments, the first side fin length is between about 30 and about 10 inches. In some embodiments, the first side fin length is between about 13.5 and about 11.5 inches. In the illustrative embodiment, the first side fin length is about 12 inches. In other embodiments, the first side fin length is about 25 inches. In other embodiments, the first side fin length is about 20 inches.

The second side fin assembly 114A includes an outer surface 132A, an inner surface 134A spaced apart from the outer surface 132A, and a rear surface 136A as shown in FIG. 2. The second side fin assembly 114A is substantially similar to the first side fin assembly 114. As such, the second side fin assembly 114A is not discussed in detail.

The plurality of mounting brackets 150 couple together the fin assemblies 112, 114, 114A as shown in FIG. 3. Mounting brackets 150 are coupled to rear surfaces 126, 136, 136A and are arranged to interconnect the nose gap reducer 110 and the first trailer 14 as shown in FIG. 6. In the illustrative embodiment, the mounting brackets 150 are aligned with reinforcing structures included in the trailer 14. The mounting brackets 150 are coupled with the rear surface 126 and the first trailer 14 by fasteners such as, for example, rivets, bolts, screws, or any suitable alternative.

In the illustrative embodiment, the mounting brackets 150 include plates 156 and L-shaped brackets 158. The plates 156 couple the side fin assemblies 114, 114A to the upper fin assembly 112 and the first trailer 14. The L-shaped brackets 158 couple the upper fin assembly 112 with the first trailer 14. A portion of each L-shaped bracket 158 extends along the rear surface 126 of the upper fin assembly 112. Another portion of each L-shaped brackets 158 extends outwardly away from the upper fin assembly 112 and overlies a portion of the roof 30 as shown in FIG. 6.

Figure 5:
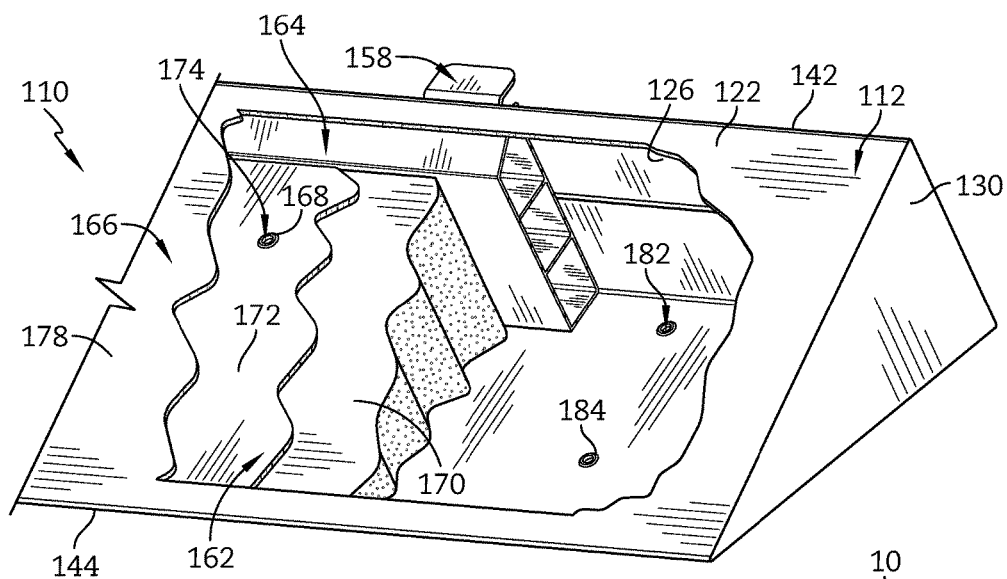
FIG. 5 is a cutaway view of a portion of the upper fin assembly included in the compressible nose gap reducer of FIG. 2 showing that the fin assemblies include a fin insert having a compressible body and an inner layer arranged around the compressible body, a support backer extending along the fin insert, and a housing having an outer layer arranged around the fin insert and the support backer and a plurality of mounting brackets.

Referring to FIGS. 5 and 6, the upper fin assembly 112 includes a fin insert 162, a support backer 164, and a housing 166. Similarly, the side fin assemblies 114, 114A each include a housing, a fin insert, and a support backer that are significantly similar to the fin insert 162, the support backer 164, and the housing 166 included in the upper fin assembly 112. As such, the fin insert, the support backer, and the housing included in the side fin assemblies 114, 114A are not discussed in detail.

The fin insert 162 is configured to be compressed to reduce the length of the upper fin assembly 112. The support backer 164 couples the upper fin assembly 112 with the mounting brackets 150. The housing 166 is arranged around the fin insert 162 and the support backer 164 and is arranged to couple the upper fin assembly 112 with the first trailer 14.

The fin insert 162 includes a compressible body 170 and an inner layer 172 as shown in FIG. 5. The compressible body 170 is formed to provide the upper fin assembly 112 with the desired shape. The compressible body 170 is configured to be compressed by a compression force to reduce the length of the upper fin assembly 112 and to return to its pre-compressed shape when the compression force is removed.

In some embodiments, the compressible body 170 is configured to be compressed to between about 80 percent and about 30 percent of its pre-compressed length. In some embodiments, the compressible body 170 is configured to be compressed to between about 80 percent and about 20 percent of its pre-compressed length. In some embodiments, the compressible body 170 is configured to be compressed to between about 75 percent and about 40 percent of its pre-compressed length. In some embodiments, the compressible body 170 is configured to be compressed to about 75 percent of its pre-compressed length. In some embodiments, the compressible body 170 is configured to be compressed to about 40 percent of its pre-compressed length.

In some embodiments, the compressible body 170 comprises foam material. In some embodiments, the compressible body 170 comprises light-weight foam material. In some embodiments, the compressible body 170 comprises polystyrene.

The inner layer 172 is arranged around the compressible body 170 to block liquids such as water, for example, from contacting the compressible body 170. Illustratively, the inner layer 172 comprises plastic material. In some embodiments, the inner layer 172 is omitted.

The inner layer 172 includes evacuation apertures 174 as shown in FIGS. 5 and 6. The evacuation apertures 174 allow air and other fluids such as water, for example, located in the compressible body 170 to pass through the inner layer 172 when the compressible body 170 is compressed to allow the fin insert 162 to be compressed and reduced in size. In the illustrative embodiments, the evacuation apertures 174 are located in spaced apart relation to purge holes 182 included in the housing 166. As a result, the evacuation apertures 174 are located toward an upper end of the fin insert 162 away from ground. Illustratively, the fin insert 162 includes grommets 168 arranged to form the evacuation apertures 174.

The support backer 164 is positioned between the fin insert 162 and the housing 166 as shown in FIGS. 5 and 6. The support backer 164 extends along the width of the upper fin assembly 112 in the illustrative embodiment. The support backer 164 comprises a rigid material and is coupled with the mounting brackets 150 as shown in FIG. 6. In the illustrative embodiment, the support backer 164 comprises plastic material. In the illustrative embodiment, the support backer 164 is formed by an extrusion process. The support backer 164 includes an outer wall 176 configured to receive fasteners and ribs 180 arranged to support the outer wall 176 as shown in FIG. 6.

The housing 166 includes an outer layer 178 and mounting brackets 150 as shown in FIGS. 5 and 6. The outer layer 178 is arranged around the fin insert 162 and the support backer 164 to block liquids such as water, for example, from entering the upper fin assembly 112. The mounting brackets 150 couple the upper fin assembly 112 with the first trailer 14.

The outer layer 178 reduces damage to the fin insert 162. In the illustrative embodiment, the outer layer 178 comprises vinyl material. The outer layer 178 includes purge holes 182 as shown in FIG. 6. The purge holes 182 allow air and fluids inadvertently located in the compressible body 170 such as water, for example, to pass through the outer layer 178 when the compressible body 170 is compressed to allow the upper fin assembly 112 to be compressed and reduced in size. In the illustrative embodiments, the purge holes 182 are located at a lower end of the upper fin assembly 112 to allow gravity to assist in draining any fluids that inadvertently enter the upper fin assembly 112. Illustratively, the housing 166 includes grommets 184 arranged to form the purge holes 182.

The front end of the first trailer 14 is configured to be coupled to the tractor unit 12 for towing the first trailer 14 thereon. The front end of the second trailer 14A is configured to be coupled to the first trailer 14 by a converter dolly to allow the tractor unit 12 to tow the first and second trailers 14, 14A thus providing the semi-trailer truck 10. It should be understood that while the nose gap reducer 110 is shown for use with a semi-trailer truck 10, the nose gap reducer 110 may be coupled to any vehicle to reduce the drag thereon.

In other embodiments, the second trailer 14A is omitted from semi-trailer truck 10. In some embodiment, the nose gap reducer 110 is used with pup trailers as shown in FIG. 1. In other embodiments, the nose gap reducer 110 is used with full-sized trailers or any other suitable sized trailer.

Illustratively, the nose gap reducer 110, as well as other nose gap reducers described herein, extends away from the front end wall 22 of the trailers 14, 14A toward the tractor unit 12. In particular, the nose gap reducers extend generally along an outer perimeter of the front end wall 22 of the trailers 14, 14A. However, the nose gap reducers described herein may be modified to extend along a greater or a lesser length of the outer perimeter of the front end wall 22 than what is illustratively shown in the figures. In other words, the nose gap reducers disclosed herein may be modified to extend along the entire, or substantially the entire, outer perimeter of the front end wall 22 of the trailers 14, 14A or may be modified to extend along only a small portion of the perimeter of the front end wall 22 of the trailers 14, 14A.

Illustratively, the semi-trailer truck 10 includes two nose gap reducers. In particular, one nose gap reducer is coupled to the front end wall 22 of the first trailer 14 and extends away from the front end wall 22 toward the tractor unit 12 and the other nose gap reducer is coupled to the front end wall 22 of the second trailer 14A and extends away from the second trailer 14A toward the first trailer 14. For purposes of the description herein, only one of the two nose gap reducers is described herein. In some embodiments, the two nose gap reducers coupled to the semi-trailer truck 10 are identical in configuration and function. In other embodiments, the two nose gap reducers coupled to the semi-trailer truck 10 are different in configuration. In some embodiments, the two nose gap reducers are different in function.

Figure 7:
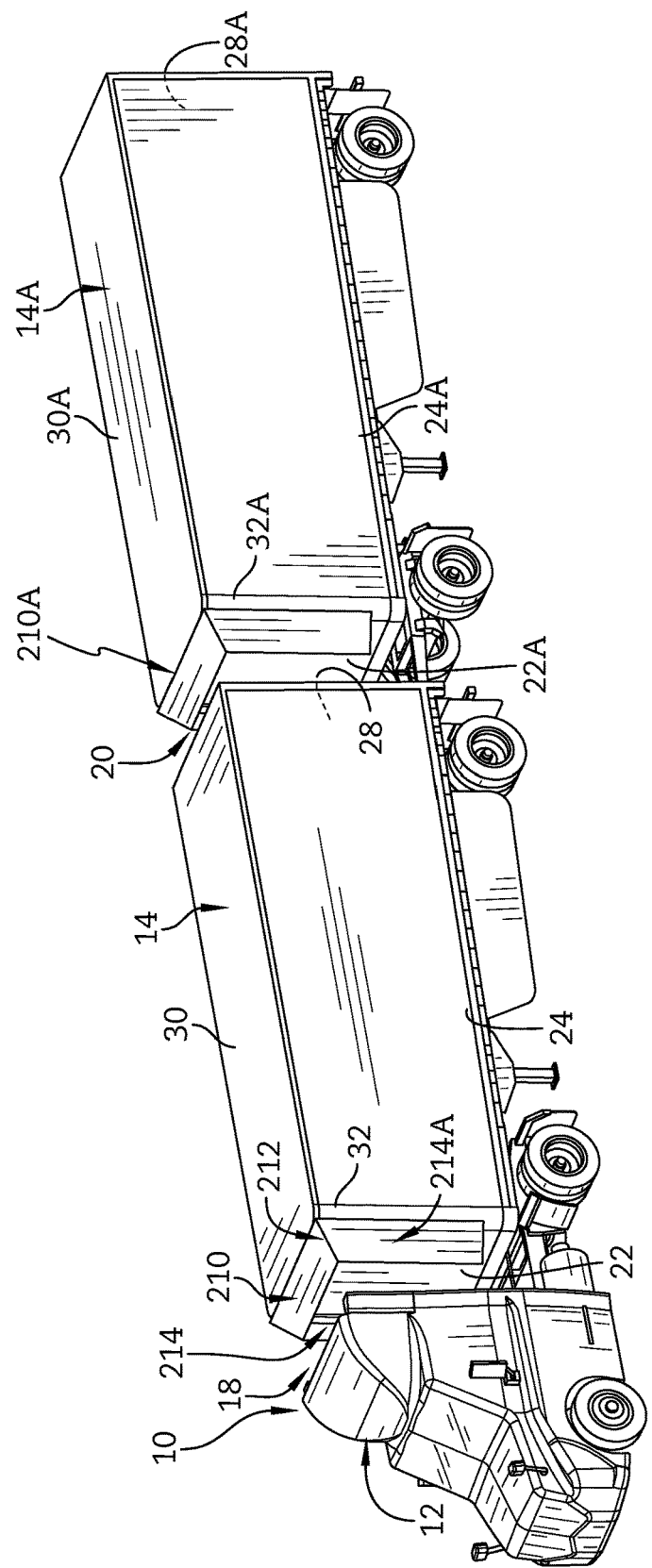
FIG. 7 is a perspective view of a semi-truck trailer having a second embodiment of a nose gap reducer and showing a nose gap reducer coupled to the first trailer and a second nose gap reducer coupled to the second trailer.
Figure 8:
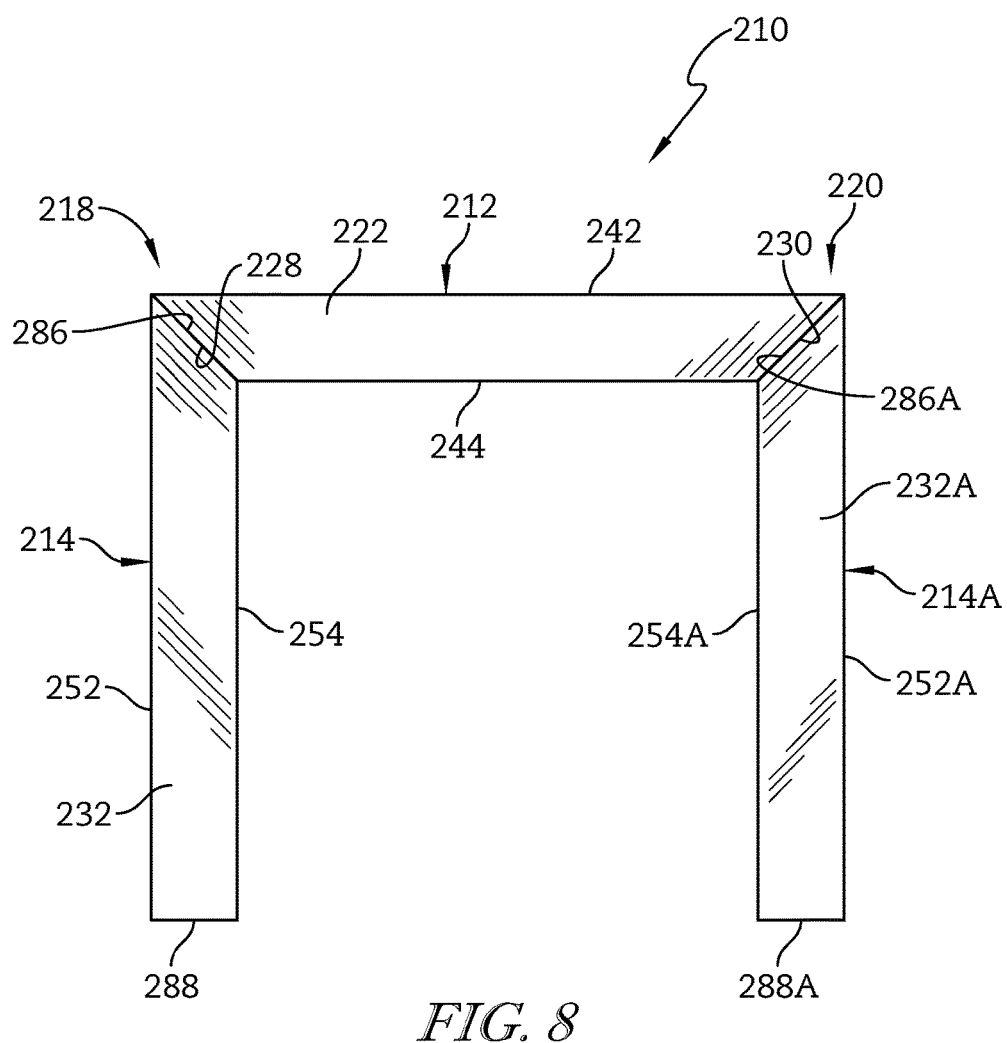
FIG. 8 is a front elevation view of the nose gap reducer coupled to the semi-trailer truck of FIG. 7.
Figure 9:
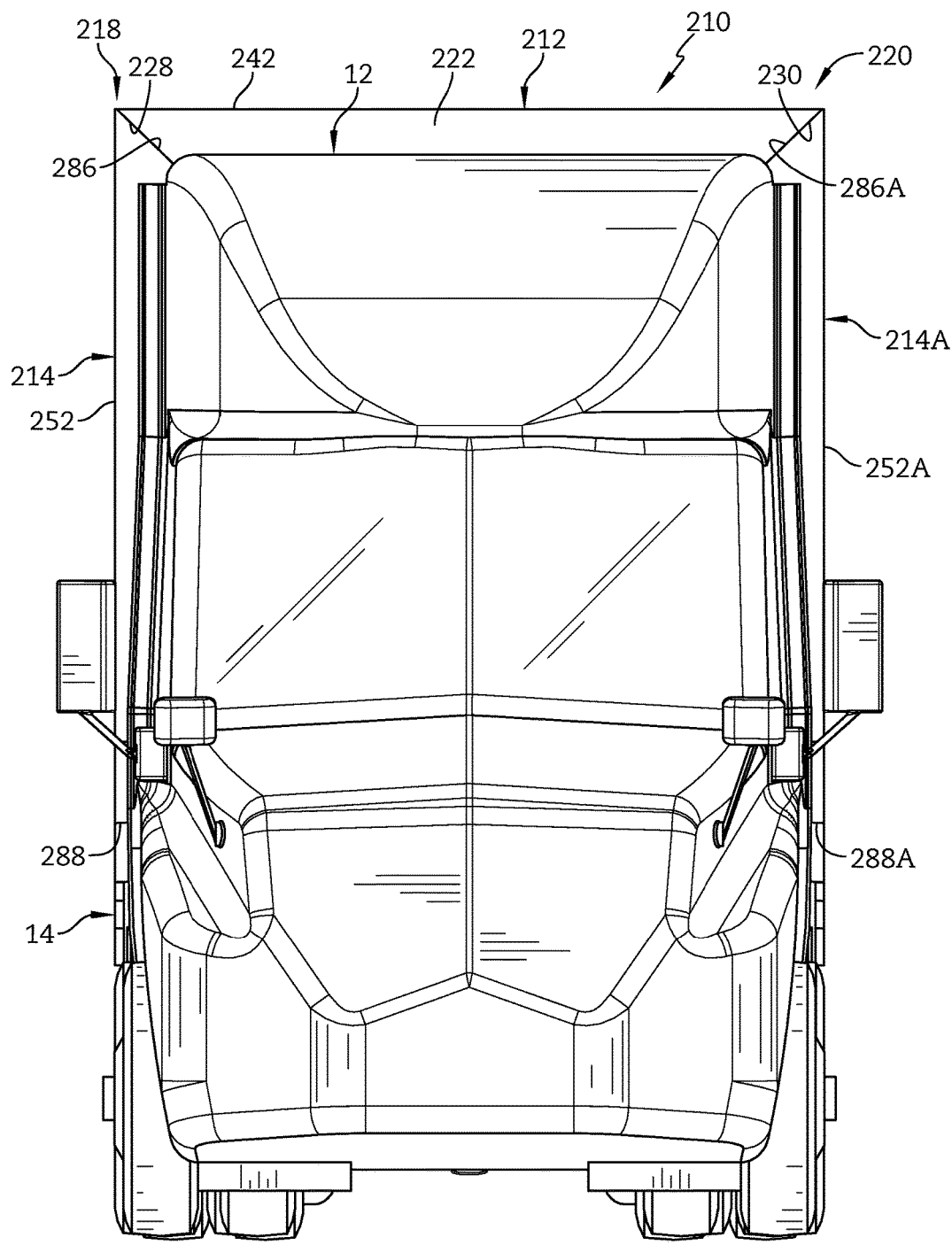
FIG. 9 is a front elevation view of the semi-trailer truck of FIG. 7 showing the nose gap reducer coupled to the first trailer.

Another illustrative nose gap reducer 210 is shown in FIGS. 7-11. The nose gap reducer 210 includes an upper fin assembly 212, a first side fin assembly 214, and a second fin assembly 214A as shown in FIGS. 7 and 8. The upper fin assembly 212 has a first end 218 and a second end 220 spaced apart from the first end 218. The upper fin assembly 212 extends generally horizontally relative to ground supporting the semi-trailer truck 10. The first side fin assembly 214 is coupled to the upper fin assembly 212 at the first end 218. The first side fin assembly 214 extends generally vertically relative to ground. The second side fin assembly 214A is coupled to the upper fin assembly 212 at the second end 220. The second side fin assembly 214A is spaced apart from the first side fin assembly 214. The second side fin assembly 214A extends generally vertically relative to ground.

In the illustrative embodiment, the upper fin assembly 212, the first side fin assembly 214, and the second side fin assembly 214A are generally flat. In other embodiments, the upper fin assembly 212, the first side fin assembly 214, and the second side fin assembly 214A are curved. The nose gap reducer 210 may be coupled to the first trailer 14 by brackets, fasteners, adhesive, or any other suitable alternative.

The upper fin assembly 212 includes an upper surface 222, an upper edge 242, a lower edge 244 spaced apart from the upper edge 242, and side edges 228, 230 interconnecting upper edge 242 and lower edge 244 as shown in FIG. 8. The upper edge 242 is generally linear and extends about horizontally relative to ground. The lower edge 244 is generally linear and extends about horizontally relative to ground. The lower edge 244 is relatively shorter than the upper edge 242. The side edges 228, 230 extend inwardly at an angle from the upper edge 242 toward the lower edge 244.

Figure 10:
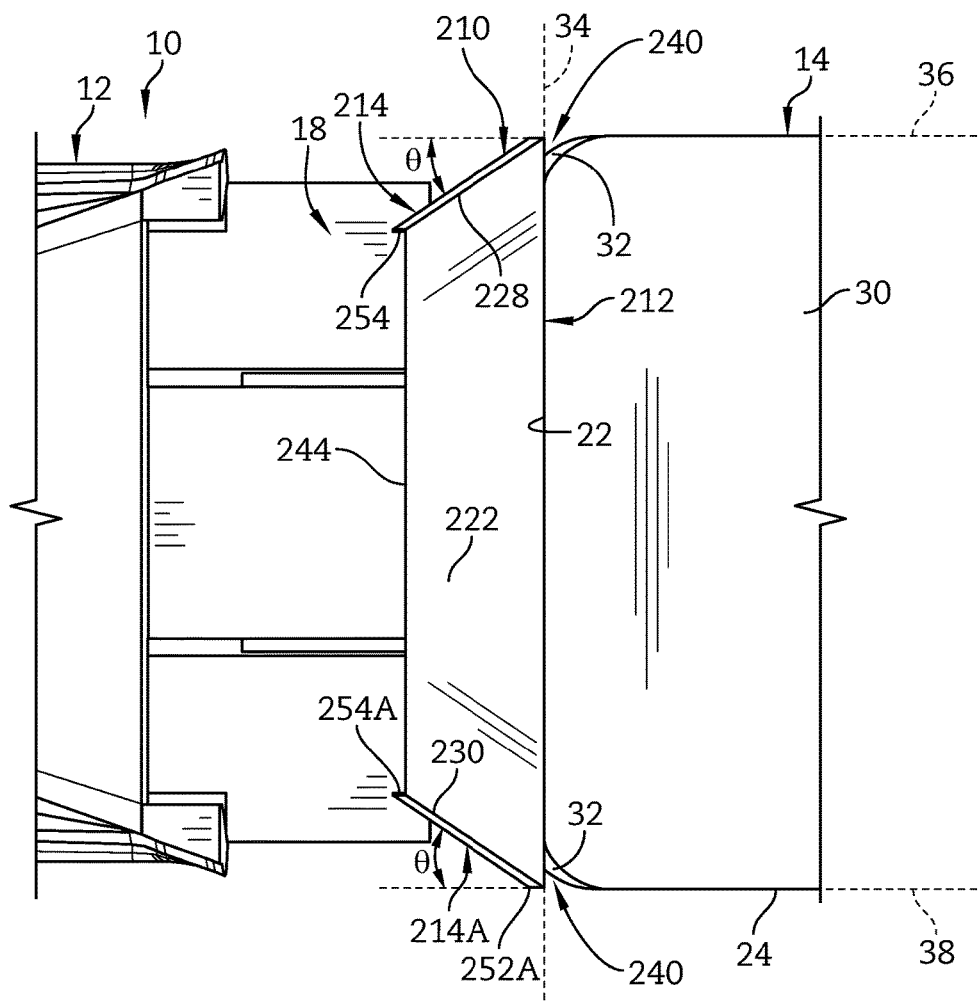
FIG. 10 is a top plan view of the semi-trailer truck of FIG. 7 showing the nose gap reducer coupled to the first trailer and extending toward a front of the tractor unit.
Figure 11:
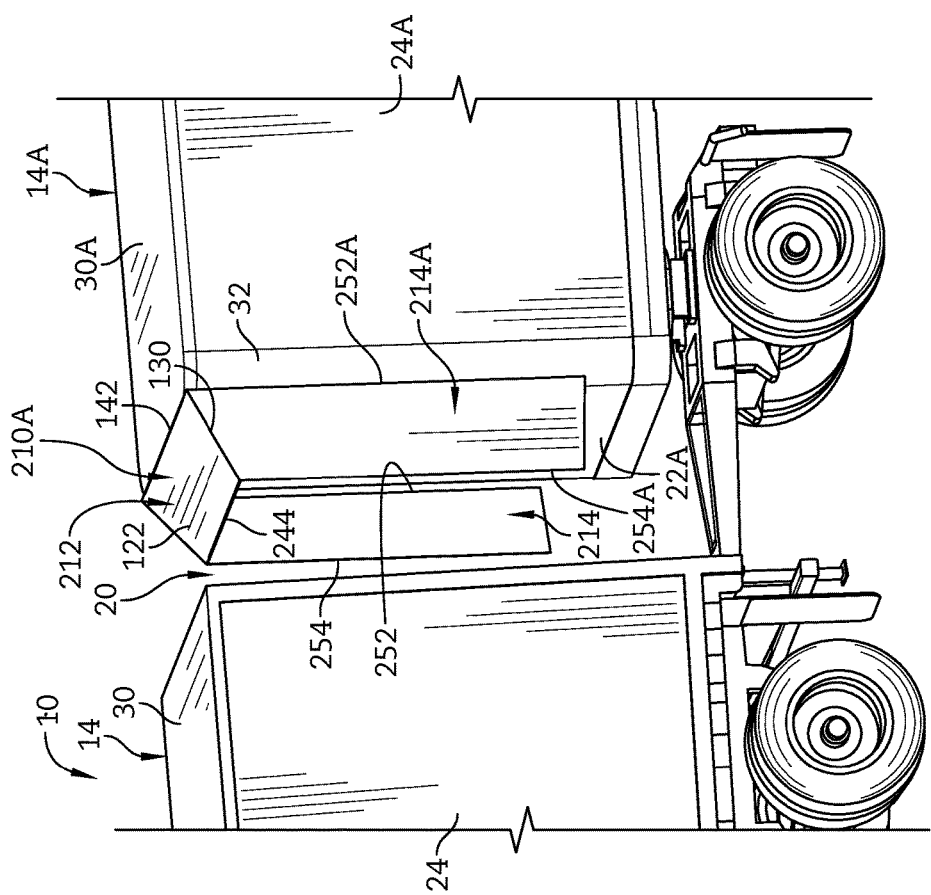
FIG. 11 is a perspective view of the nose gap reducer coupled to the second trailer included in the semi-trailer truck of FIG. 7.

The upper edge 242 lies in the roof plane 40 and the upper surface 222 extends from the upper edge 242 downwardly relative to the roof plane 40 and outwardly away from the front end wall 22 to the lower edge 244. As a result, the upper edge 242 lies about flush with the roof 30. Illustratively, the upper edge 242 extends between the side walls 24 of the first trailer 14. As a result, the first and second ends 218, 220 of the upper surface 222 lie in the side planes 36, 38. In the illustratively embodiment, the upper edge 242 has a width of about 102 inches. Illustratively, the upper surface 222 extends at an angle alpha of between about 32 and 35 degrees relative to the roof plane 40. In the illustrative embodiment, the upper edge 242 engages the first trailer 14 as shown in FIG. 10. In other embodiments, the upper edge 242 is spaced apart from the first trailer 14. Illustratively, the upper surface 222 extends about 20 inches away from the front end wall 22 toward the tractor unit 12 as measured perpendicularly relative to front end wall 22.

The first side fin assembly 214 includes an outer surface 232, an outer edge 252, an inner edge 254 spaced apart from the outer edge 252, and side edges 286, 288 interconnecting outer edge 252 and the inner edge 254 as shown in FIG. 8. The outer edge 252 is generally linear and extends about vertically relative to ground. The inner edge 254 is generally linear and extends about vertically relative to ground. The inner edge 254 is relatively shorter than the outer edge 252. The side edge 286 extends along the side edge 228 of upper surface 222 at an angle from the outer edge 252 toward the inner edge 254. The side edge 288 extends about horizontally relative to ground and interconnects the outer and inner edges 252, 254.

The outer edge 252 lies about in the side plane 36 and the outer surface 232 extends from the outer edge 252 inwardly relative to the side plane 36 and outwardly away from the front end wall 22 to the inner edge 254 as shown in FIG. 10. As a result, the outer edge 252 is about flush with the side wall 24. Illustratively, the outer surface 232 extends from the side plane 36 toward the opposite side plane 38. In the illustrative embodiment, the outer edge 252 has a length of about 136 inches. Illustratively, the first side fin assembly 214 extends at an angle of about 34 degrees relative to the side plane 36. Illustratively, the first side fin assembly 214 extends about 20 inches away from the front end wall 22 toward the tractor unit 12 as measured perpendicularly relative to front end wall 22.

The second side fin assembly 214A includes an outer surface 323A, an outer edge 252A, an inner edge 254A spaced apart from the outer edge 252A, and side edges 286A, 288A interconnecting outer edge 252A and the inner edge 254A as shown in FIG. 8. The second side fin assembly 214A is substantially similar to the first side fin assembly 214. As such, the second side fin assembly 214A is not discussed in detail.

The nose gap reducer 210 is a vented nose gap reducer 210 as shown in FIG. 10. In the illustrative embodiment, a vent gap 240 is formed between the first trailer 14 and the nose gap reducer 210. The upper edge 242 and the outer edges 252 are spaced apart from the front end wall 22 of the first trailer 14 due to the rounded corner joints 32 as shown in FIG. 10. Airflow in the tractor-trailer gap 18 and the trailer-trailer gap 20 is free to flow through the vent gaps 240 and out of the gaps 18, 20. As a result, airflow trapped in the gap 18 is free to escape through the vent gaps 240. The vent gap 240 may allow high velocity airflow passing the sides of the nose gap reducer 210 to draw turbulent air out from the front end wall 22 of the first trailer 14.

In some embodiments, the nose gap reducer 210 is compressible. In such embodiments, the fin assemblies 212, 214, 214A may include a fin insert, a support backer, and a housing.

Another illustrative nose gap reducer 310 is shown in FIGS. 12-16. The nose gap reducer 310 is configured for use with the semi-trailer truck 10 and is substantially similar to the nose gap reducer 210 shown in FIGS. 7-11 and described herein. Accordingly, similar reference numbers in the 300 series indicate features that are common between the nose gap reducer 210 and the nose gap reducer 310. The description of the nose gap reducer 210 is hereby incorporated by reference to apply to the nose gap reducer 310, except in instances when it conflicts with the specific description and drawings of the nose gap reducer 310.

Figure 12:
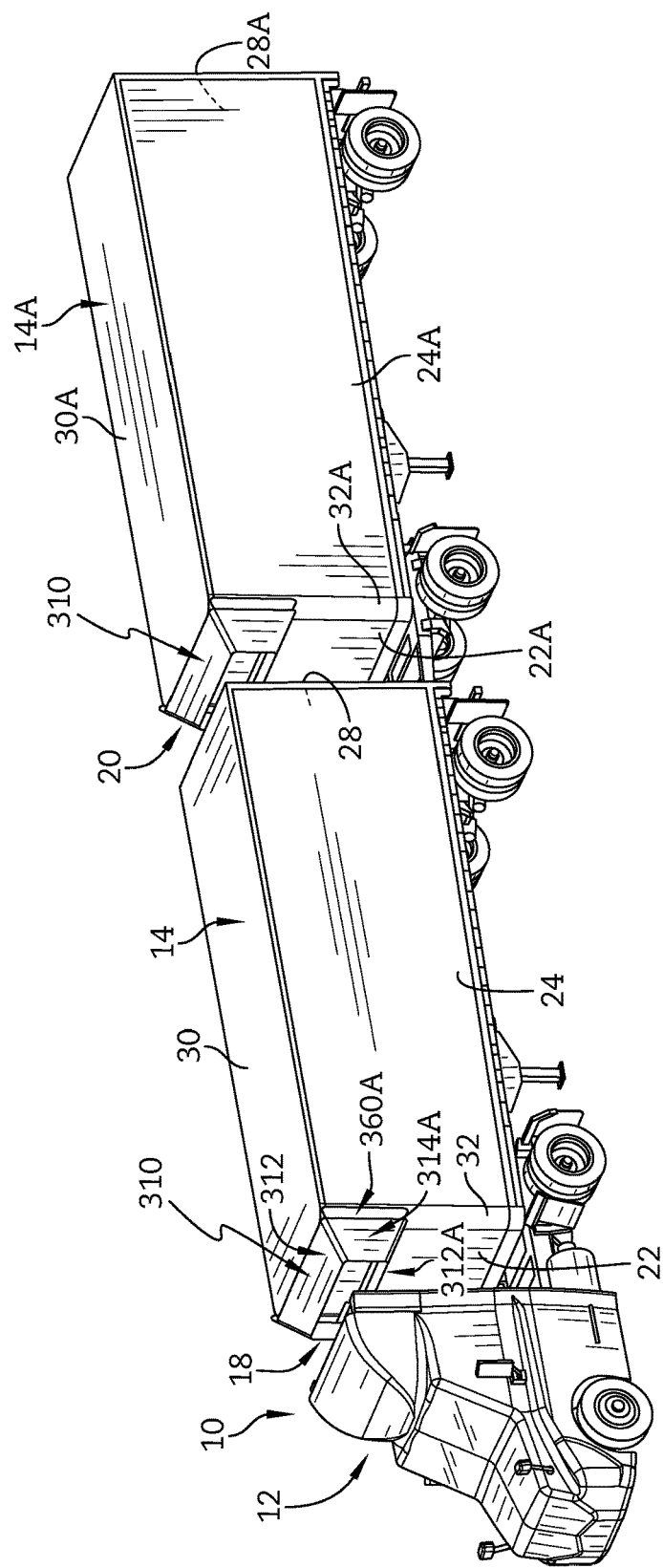
FIG. 12 is a perspective view of a semi-truck trailer having a third embodiment of a nose gap reducer and showing a nose gap reducer coupled to the first trailer and a second nose gap reducer coupled to the second trailer.
Figure 13:
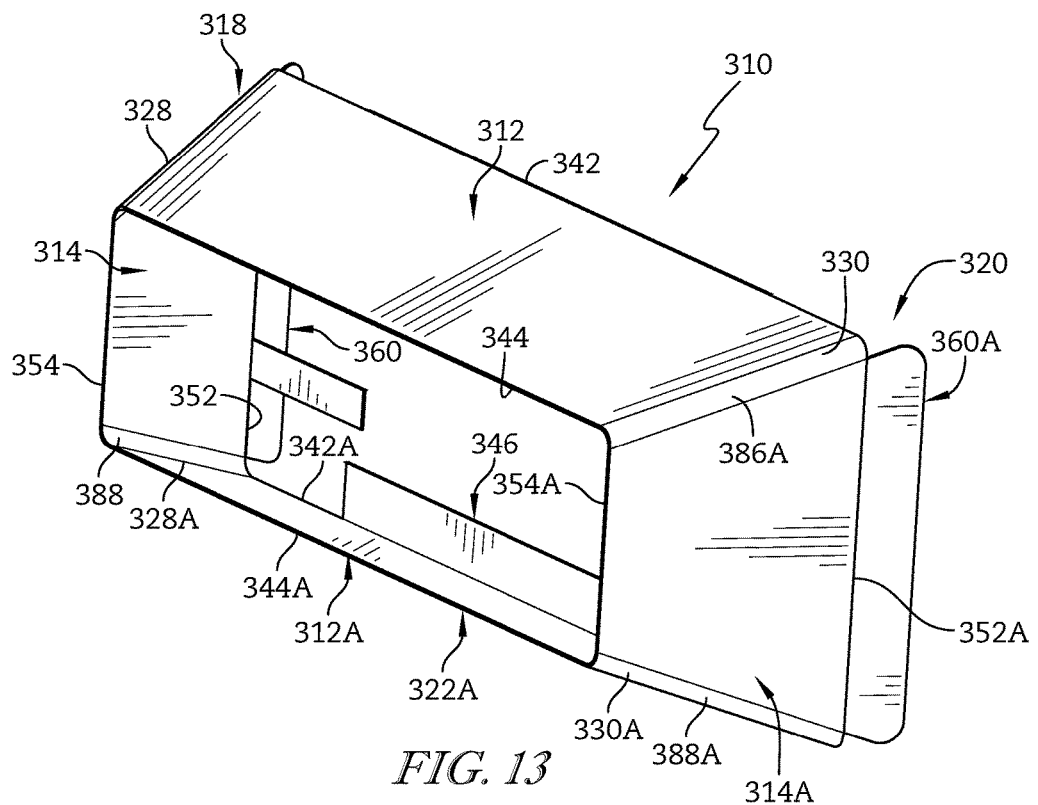
FIG. 13 is a perspective view of the third embodiment of the nose gap reducer.
Figure 14:
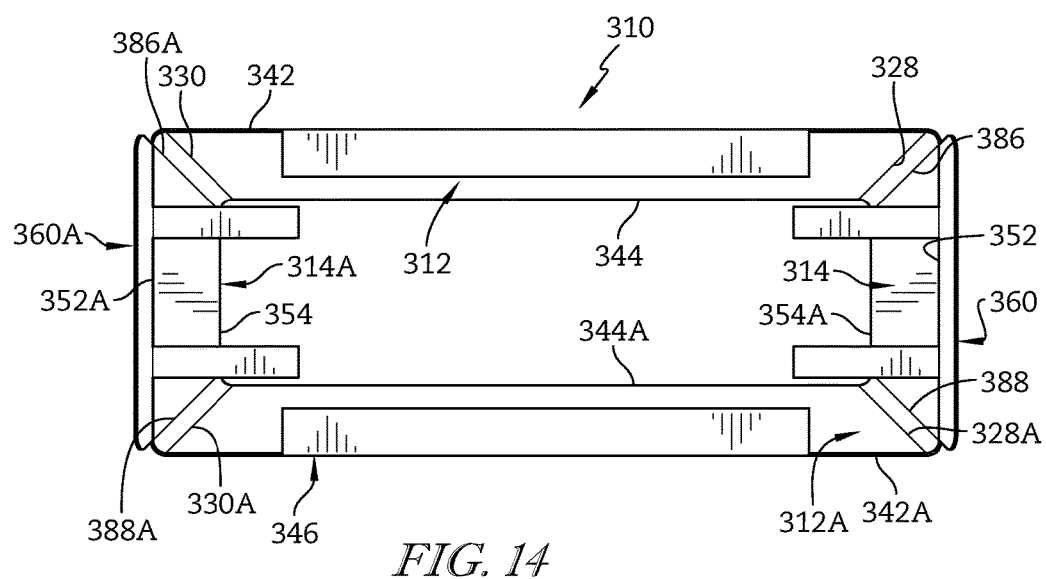
FIG. 14 is a back elevation view of the nose gap reducer of FIG. 13.
Figure 15:
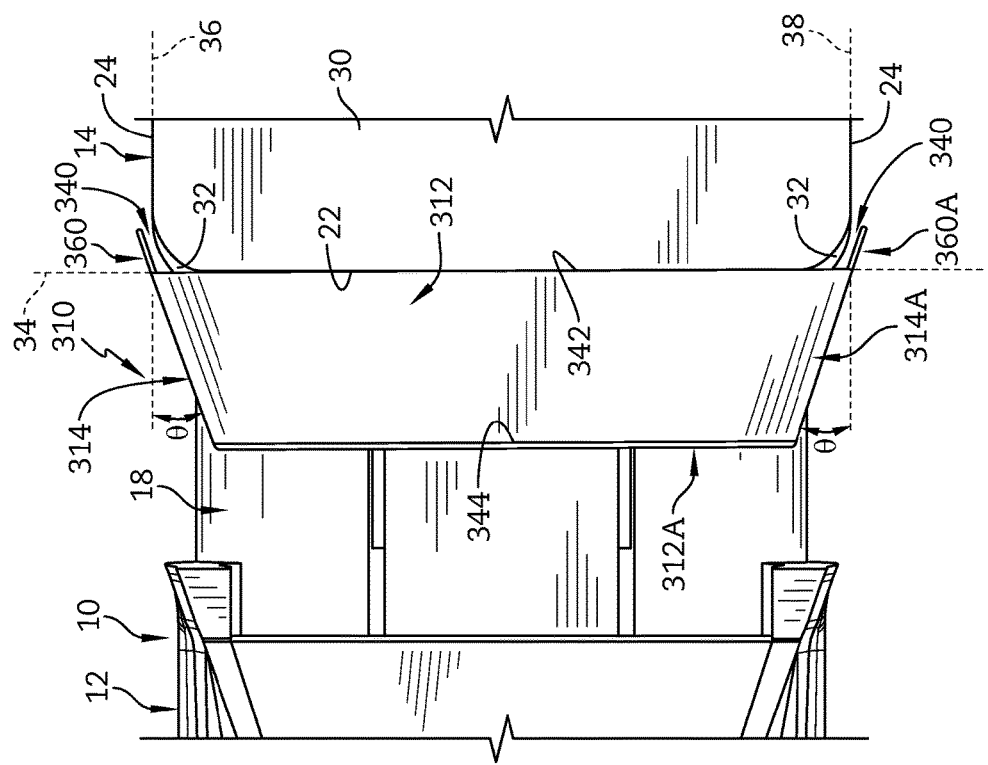
FIG. 15 is a top plan view of the semi-trailer truck of FIG. 12 showing the nose gap reducer coupled to the first trailer and extending toward a front of the tractor unit.
Figure 16:
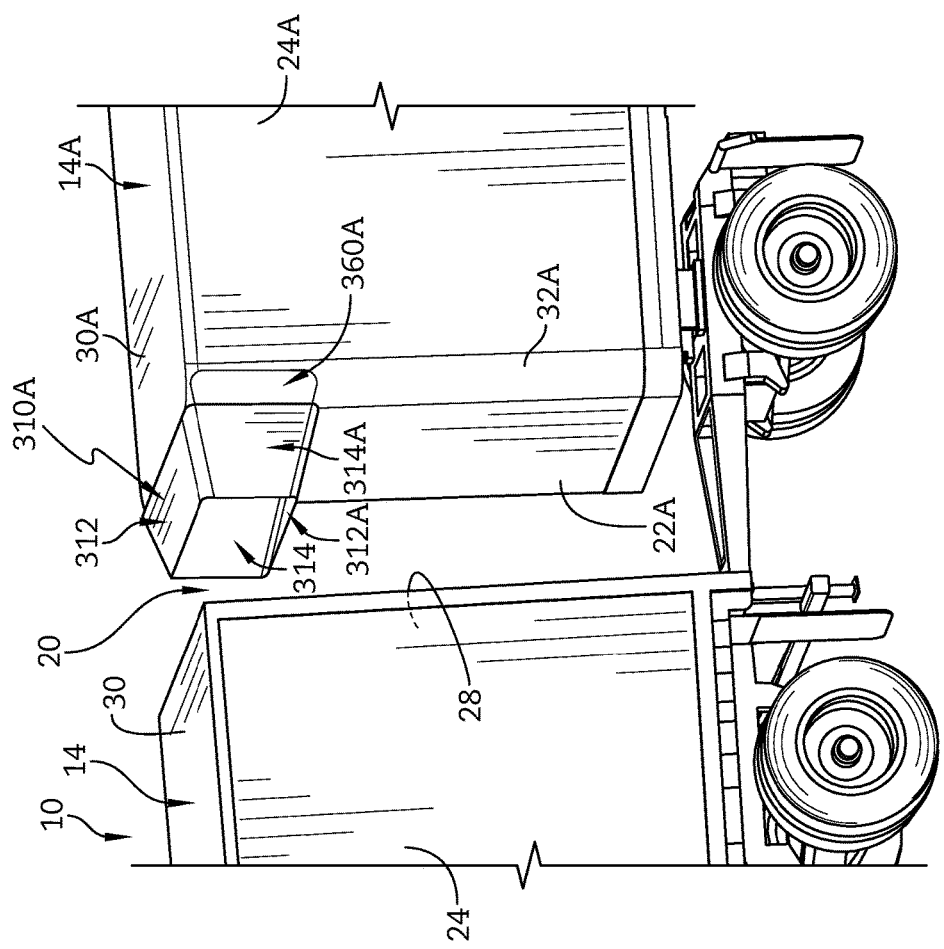
FIG. 16 is a perspective view of the nose gap reducer coupled to the second trailer included in the semi-trailer truck of FIG. 12.

The nose gap reducer 310 is a vented nose gap reducer and may reduce a large proportion of drag for a relatively small addition of weight to the semi-trailer truck 10 if, for example, a large portion of the airflow entering the gaps 18, 20 enter from the top of the semi-trailer truck 10. The nose gap reducer 310 includes an upper fin assembly 312 and side fin assemblies 314, 314A. The nose gap reducer 310 further includes a lower fin assembly 312A, side extenders 360, 360A, and inner beams 346 as shown in FIGS. 13-15. The nose gap reducer 310 may be coupled to the first trailer 14 as shown in FIG. 12 and/or coupled to the second trailer 14A as shown in FIGS. 12 and 16.

The lower fin assembly 312A includes a lower surface 322A, an upper edge 344A, a lower edge 342A spaced apart from the upper edge 344A, and side edges 328A, 230A interconnecting upper edge 344A and lower edge 342A as shown in FIG. 13. The lower edge 342A is generally linear and extends about horizontally relative to ground. The upper edge 344A is generally linear and extends about horizontally relative to ground. The upper edge 344A is relatively shorter than the lower edge 342A and the side edges 328A, 330A extend inwardly at an angle from the lower edge 342A toward the upper edge 344A.

The lower surface 322A extends upwardly relative to ground and outwardly away from the front end wall 22.

Illustratively, the lower edge 342A extends between the side walls 24 of the first trailer 14. In the illustratively embodiment, the lower edge 342A has a width of about 102 inches. Illustratively, the lower surface 322A extends at an angle of about 20 degrees relative to ground. Illustratively, the lower surface 322A extends about 24 inches away from the front end wall 22 toward the tractor unit 12 as measured perpendicularly relative to front end wall 22. In the illustrative embodiment, side edges 386, 386A, 388, 388A are curved.

In some embodiments, the first and second side fin assemblies 314, 314A extend at an angle beta of between about 10 degrees and about 30 degrees relative to the side planes 36, 38. In the illustrative embodiment, the first and second side fin assemblies 314, 314A extend at an angle beta of about 20 degrees relative to the side planes 36, 38.

In some embodiments, the upper surface 322 extends at an angle alpha of between about 10 degrees and about 30 degrees relative to the roof plane 40. In the illustrative embodiment, the upper surface 322 extends about 20 degrees relative to the roof plane 40. The first and second surfaces 336, 336A have a height of about 38 to about 42 inches. Illustratively, the first and second surfaces 336, 336A have a height of about 45 inches.

Side extenders 360, 360A extend along the outer surfaces 352, 352A of the first and second side fin assemblies 314, 314A as shown in FIG. 13. The side extenders 360, 360A are generally flat. The side extenders 360, 360A are about parallel with the first and second side surfaces 336, 336A respectively.

The inner beams 346 may be used to couple the nose gap reducer 310 with the trailers 14, 14A. In some embodiments, the nose gap reducer 210 shown in FIGS. 7-11 may include inner beams that are similar to inner beams 346. In some embodiments, the nose gap reducer 210 shown in FIGS. 7-11 may include side extenders that are similar to side extenders 344. In some embodiments, the nose gap reducer 310 is compressible. In such embodiments, the fin assemblies 312, 314, 314A, 312A include a fin insert, a support backer, and a housing.

Another illustrative nose gap reducer 410 is shown in FIGS. 17-21. The nose gap reducer 410 is configured for use with the semi-trailer truck 10 and is substantially similar to the nose gap reducer 310 shown in FIGS. 12-16 and described herein. Accordingly, similar reference numbers in the 400 series indicate features that are common between the nose gap reducer 310 and the nose gap reducer 410. The description of the nose gap reducers 310 is hereby incorporated by reference to apply to the nose gap reducer 410, except in instances when it conflicts with the specific description and drawings of the nose gap reducer 410.

Figure 17:
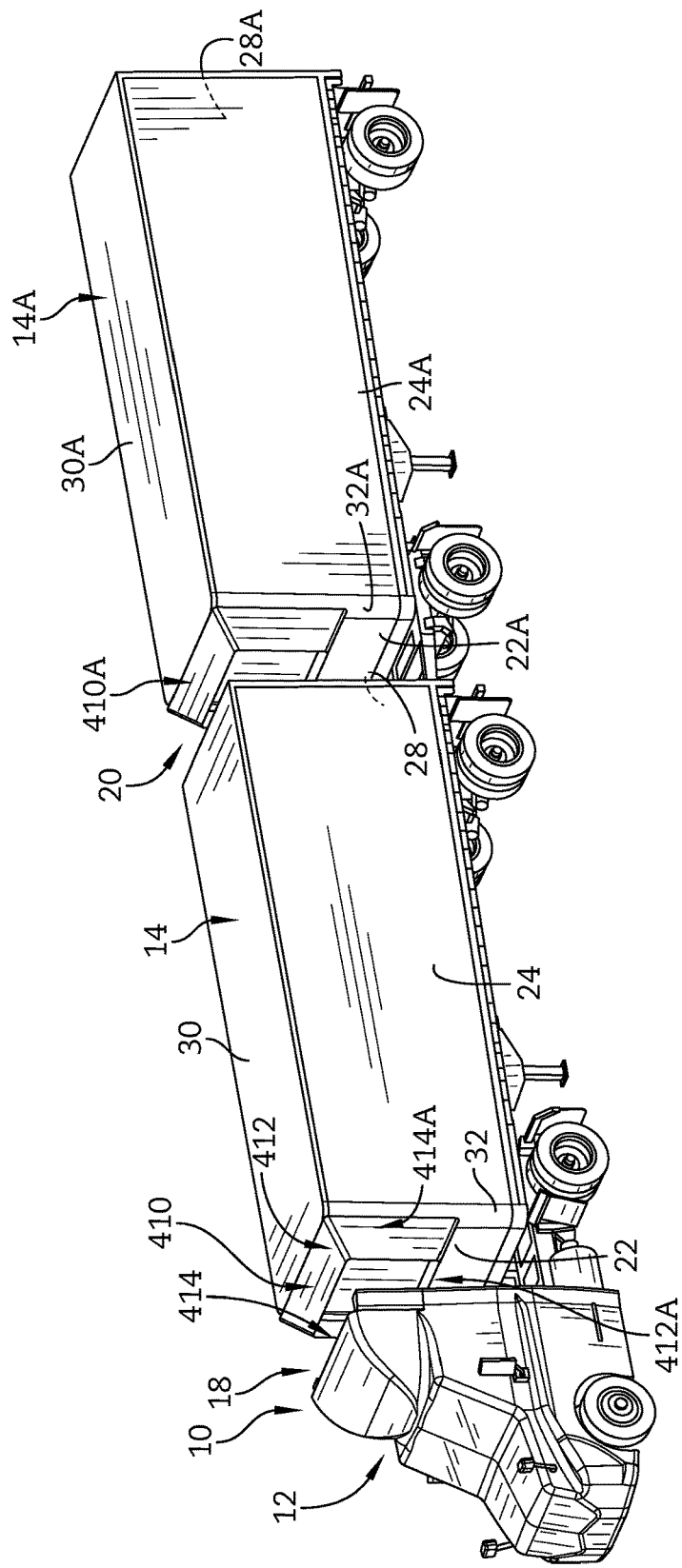
FIG. 17 is a perspective view of a semi-truck trailer having a fourth embodiment of a nose gap reducer and showing a nose gap reducer coupled to the first trailer and a second nose gap reducer coupled to the second trailer.
Figure 20:
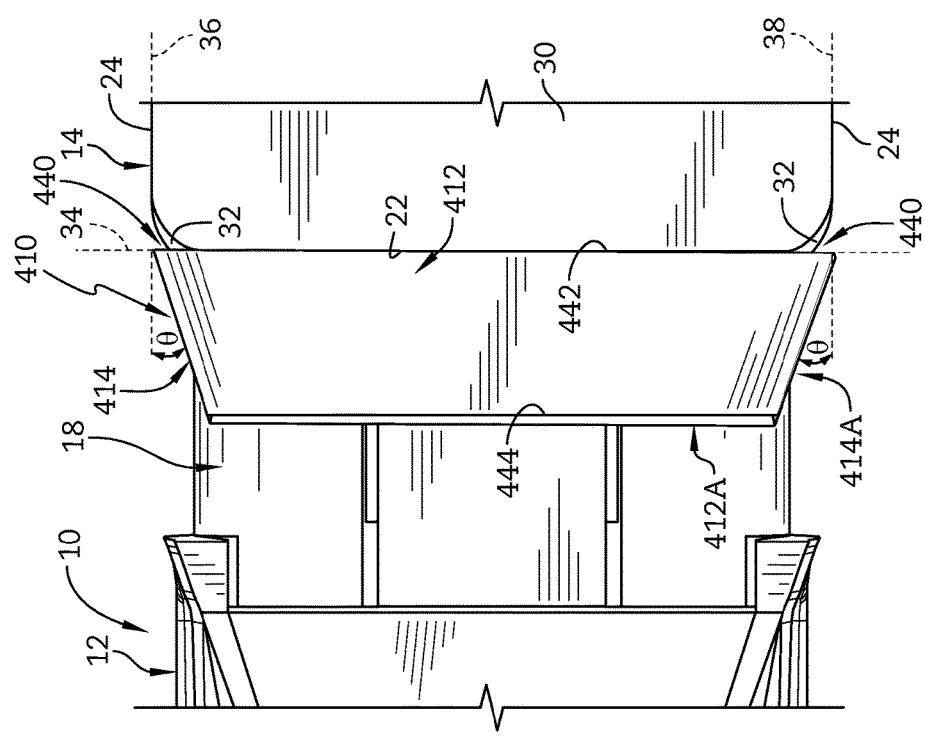
FIG. 20 is a top plan view of the semi-trailer truck of FIG. 17 showing the nose gap reducer coupled to the first trailer and extending toward a front of the tractor unit.
Figure 21:
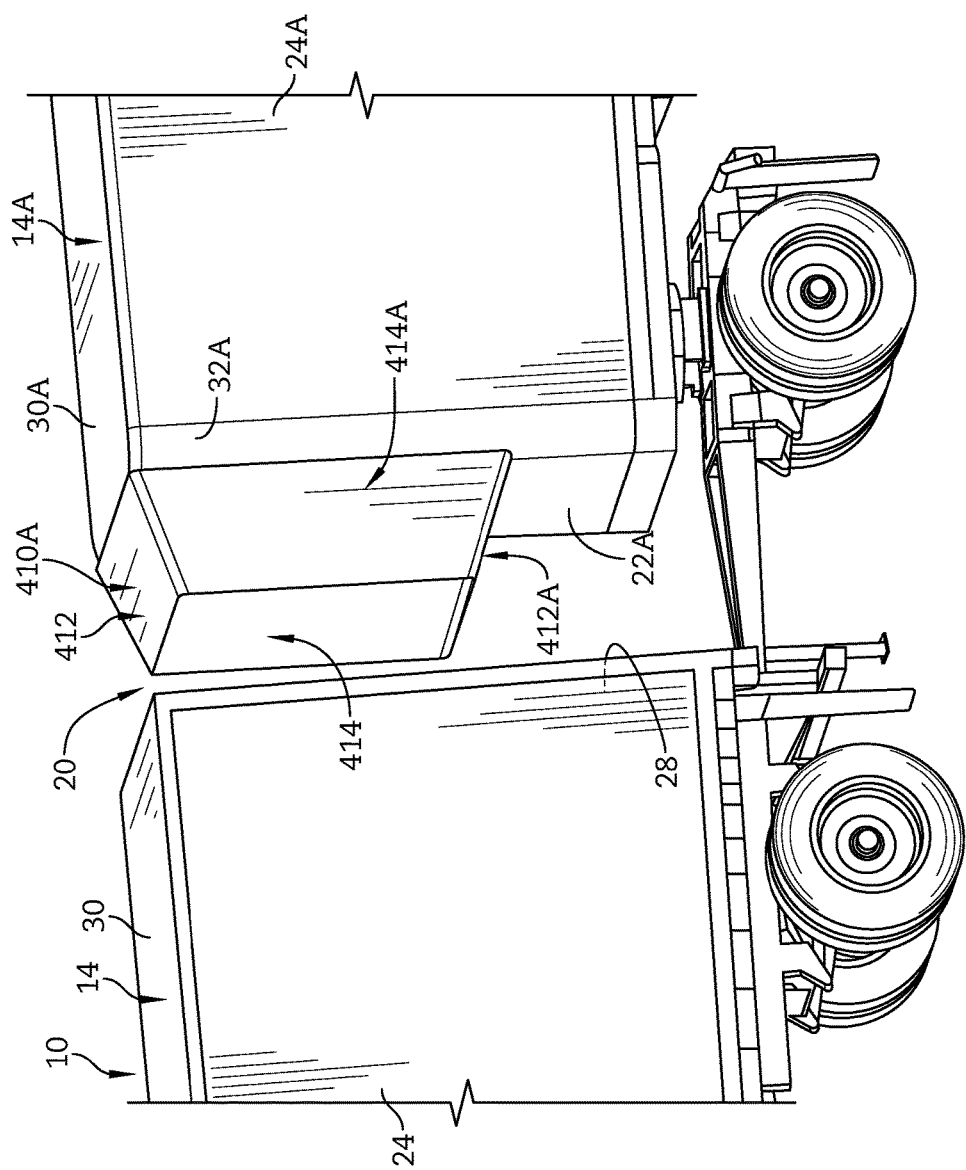
FIG. 21 is a perspective view of the nose gap reducer coupled to the second trailer included in the semi-trailer truck of FIG. 17.

The nose gap reducer 410 is a vented nose gap reducer and may redirect airflow to block air flow from exiting the gaps 18, 20 around a bottom of the trailers 14, 14A and block the air from hitting a converter dolly. The nose gap reducer 410 includes an upper fin assembly 412, a first side fin assembly 414, a second side fin assembly 414A, and a lower fin assembly 412A as shown in FIGS. 17-19. The nose gap reducer 410 further includes the inner beams 446. The nose gap reducer 410 has a relatively larger height as compared to nose gap reducer 310. In the illustrative embodiment, the outer edge 452 has a height of about 78 inches. The nose gap reducer 410 may be coupled to the first trailer 14 as shown in FIG. 17 and/or coupled to the second trailer 14A as shown in FIGS. 17 and 21.

While the disclosure has been illustrated and described in detail in the foregoing drawings and description, the same is to be considered as illustrative and not restrictive in character, it being understood that only illustrative embodiments thereof have been shown and described and that all changes and modifications that come within the spirit of the disclosure are desired to be protected.

What is claimed is:

1. An aerodynamic nose gap reducer for reducing drag on a trailer, the nose gap reducer comprising:
   a rigid support backer that extends along a width of the nose gap reducer,
   a compressible fin insert that extends outwardly away from the rigid support backer, the compressible fin insert being configured to compress to reduce a length of the nose gap reducer in response to a compression force being applied to the compressible fin insert and to return to a pre-compressed shape in response to the compression force being removed from the compressible fin insert, and
   a deformable housing arranged around the compressible fin insert and the rigid support backer, the deformable housing being configured to change shape with the compressible fin insert;
   wherein the deformable housing and the rigid support backer encase the compressible fin.

2. The nose gap reducer of claim 1, further comprising a first surface and a second surface connected to the first surface, the first surface is angled relative to the second surface by an angle alpha, and the angle alpha is between about 15 degrees and about 40 degrees.

3. The nose gap reducer of claim 2, wherein the angle alpha is about 33 degrees.

4. The nose gap reducer of claim 2, further comprising a third surface that extends between the first and second surfaces along the width of the nose gap reducer and a fourth surface that interconnects the first, second, and third surfaces, the fourth surface is angled relative to the third surface by an angle beta, and the angle beta is between about 15 degrees and about 40 degrees.

5. The nose gap reducer claim 4, wherein the angle beta is between about 30 degrees and about 35 degrees.

6. The nose gap reducer of claim 1, wherein the compressible fin insert includes a compressible body comprising foam material and an inner layer arranged around the compressible body, the compressible body has a triangular cross-section when viewed along the width of the nose gap reducer, the compressible fin insert is configured to be compressed to between about 80 percent and about 30 percent of a pre-compressed length of the compressible fin insert and to return to about 100 percent of the pre-compressed length in response to the compression force being removed.

7. The nose gap reducer of claim 6, wherein the inner layer is formed to define a plurality of evacuation apertures that extend through the inner layer and the evacuation apertures are located at an upper end of the compressible fin insert relative to ground.

8. The nose gap reducer of claim 7, wherein the deformable housing is formed to include a plurality of purge holes extending through the deformable housing and the purge holes are located at a lower end of the nose gap reducer relative to ground.

9. The nose gap reducer of claim 1, wherein the rigid support backer includes an outer wall and a plurality of ribs coupled to the outer wall and the housing includes a plurality of brackets coupled to the outer wall of the rigid support backer.

10. A method of making and using a compressible nose gap reducer for a trailer, the method comprising:

providing a compressible upper fin assembly, a compressible first side fin assembly, and a compressible second side fin assembly, each of the compressible fin assemblies being configured to compress and reduce in length in response to a compression force being applied to the corresponding upper fin assembly, first side fin assembly, and second side fin assembly and to return to a pre-compressed shape in response to the compression force being removed from the corresponding upper fin assembly, first side fin assembly, and second side fin assembly, and coupling together the upper fin assembly, the first side fin assembly, and the second side fin assembly to form the nose gap reducer, wherein when a structure is moved into engagement with the nose gap reducer, a length of the nose gap reducer is reduced by between about 30 percent and about 80 percent of a pre-compressed length of the nose gap reducer and when the structure is moved out of engagement with the nose gap reducer, the nose gap reducer returns to about the pre-compressed length of the nose gap reducer.

11. The method of claim 10, further comprising applying the compression force to the nose gap reducer to compress at least one of the upper fin assembly, the first side fin assembly, and the second side fin assembly to reduce a length of the nose gap reducer by between about 30 percent and about 80 percent of a pre-compressed length of the corresponding upper fin assembly, first side fin assembly, and second side fin assembly.

12. The method of claim 11, further comprising removing the compression force to cause the corresponding upper fin assembly, first side fin assembly, and second side fin assembly to return to the pre-compressed length when the compression force is removed.

13. The method of claim 10, further comprising coupling the nose gap reducer to a first trailer to form a vent gap between the first trailer and the nose gap reducer.

14. An aerodynamic nose gap reducer for reducing drag on a trailer, the nose gap reducer comprising:

a rigid support backer that extends along a width of the nose gap reducer, a compressible fin insert that extends outwardly away from the rigid support backer, the compressible fin insert being configured to compress to reduce a length of the nose gap reducer in response to a compression force being applied to the compressible fin insert and to return to a pre-compressed shape in response to the compression force being removed from the compressible fin insert, the compressible fin insert including a compressible body comprising foam material, and a deformable housing arranged around the compressible fin insert and the rigid support backer, the deformable housing being configured to change shape with the compressible fin insert.

15. The nose gap reducer of claim 14, further comprising a first surface and a second surface connected to the first surface, the first surface is angled relative to the second surface by an angle alpha, and the angle alpha is between about 15 degrees and about 40 degrees.

16. The nose gap reducer of claim 15, further comprising a third surface that extends between the first and second surfaces along the width of the nose gap reducer and a fourth surface that interconnects the first, second, and third surfaces, the fourth surface is angled relative to the third surface by an angle beta, and the angle beta is between about 15 degrees and about 40 degrees.

17. The nose gap reducer claim 16, wherein the angle beta is between about 30 degrees and about 35 degrees.

18. The nose gap reducer of claim 14, wherein compressible body further includes an inner layer arranged around the compressible body and the inner layer is formed to define a plurality of evacuation apertures that extend through the inner layer and the evacuation apertures are located at an upper end of the compressible fin insert relative to ground.

19. The nose gap reducer of claim 14, wherein the deformable housing is formed to include a plurality of purge holes extending through the deformable housing and the purge holes are located at a lower end of the nose gap reducer relative to ground.

* * * * *